(12) United States Patent
Mittal

(10) Patent No.: US 8,938,612 B1
(45) Date of Patent: Jan. 20, 2015

(54) LIMITED-ACCESS STATE FOR INADVERTENT INPUTS

(71) Applicant: Google Inc., Mountain View, CA (US)

(72) Inventor: Sanjev Kumar Mittal, Bangalore (IN)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/065,116

(22) Filed: Oct. 28, 2013

Related U.S. Application Data

(60) Provisional application No. 61/860,695, filed on Jul. 31, 2013.

(51) Int. Cl.
*G06F 21/00* (2013.01)
*G06F 21/60* (2013.01)

(52) U.S. Cl.
CPC .................. *G06F 21/604* (2013.01)
USPC ........... 713/166; 455/411; 455/566; 345/173; 713/190; 340/501; 726/3; 726/1; 726/4; 726/20

(58) Field of Classification Search
CPC ........................ G06F 21/6218; H04W 8/245
USPC ........................................... 713/166
See application file for complete search history.

(56) References Cited

U.S. PATENT DOCUMENTS

| | | | | |
|---|---|---|---|---|
| 5,559,505 A | * | 9/1996 | McNair | 340/5.28 |
| 8,136,053 B1 | | 3/2012 | Miller et al. | |
| 8,159,857 B2 | * | 4/2012 | Gammel et al. | 365/148 |
| 8,219,931 B2 | * | 7/2012 | Hsieh et al. | 715/835 |
| 8,238,876 B2 | * | 8/2012 | Teng et al. | 455/411 |
| 8,355,698 B2 | * | 1/2013 | Teng et al. | 455/411 |
| 8,504,934 B1 | * | 8/2013 | Yu et al. | 715/773 |
| 8,558,809 B2 | * | 10/2013 | Lee et al. | 345/173 |
| 8,572,515 B2 | * | 10/2013 | Ainslie et al. | 715/863 |
| 8,595,511 B2 | * | 11/2013 | Aratsu et al. | 713/190 |

(Continued)

FOREIGN PATENT DOCUMENTS

| | | |
|---|---|---|
| EP | 2 565 765 A1 | 3/2013 |
| EP | 2 613 237 A2 | 7/2013 |

OTHER PUBLICATIONS

A State-Transition Model of Trust Management and Access Control|http://www.csl.sri.com/users/ddean/papers/csfw01a.pdf|Chander et al.|pp. 1-17|2001.*

(Continued)

*Primary Examiner* — Mahfuzur Rahman
(74) *Attorney, Agent, or Firm* — Shumaker & Sieffert, P.A.

(57) ABSTRACT

Techniques for a computing device operating in access-states are provided. One example method includes receiving, by the computing device operating in a first access state, an indication of first input and responsive to determining that at least one value of a characteristic of the first input exceeds a predetermined characteristic threshold, transitioning the computing device to operate in a second access state. While the computing device is operating in the second access state, the method further includes outputting instructions for transitioning the computing device from operating in the second access state. The method further includes receiving, by the computing device operating in the second access state, an indication of a second input and responsive to determining that the indication of the second input satisfies a threshold of compliance with the instructions, transitioning the computing device from operating in the second access state to operating in the first access state.

20 Claims, 6 Drawing Sheets

(56) References Cited

U.S. PATENT DOCUMENTS

| | | | |
|---|---|---|---|
| 8,627,237 B2* | 1/2014 | Chaudhri et al. | 715/863 |
| 8,694,791 B1* | 4/2014 | Rohrweck et al. | 713/184 |
| 8,737,966 B2* | 5/2014 | Lee et al. | 455/411 |
| 2005/0076242 A1* | 4/2005 | Breuer | 713/201 |
| 2009/0216979 A1* | 8/2009 | Balasubramanian et al. | 711/163 |
| 2009/0284482 A1* | 11/2009 | Chin | 345/173 |
| 2011/0081889 A1* | 4/2011 | Gao et al. | 455/411 |
| 2011/0117970 A1* | 5/2011 | Choi | 455/566 |
| 2011/0294467 A1* | 12/2011 | Kim et al. | 455/411 |
| 2012/0124644 A1 | 5/2012 | LeBeau et al. | |
| 2012/0133484 A1* | 5/2012 | Griffin | 340/5.54 |
| 2012/0159567 A1* | 6/2012 | Toy et al. | 726/1 |
| 2012/0159582 A1 | 6/2012 | Griffin et al. | |
| 2012/0243729 A1 | 9/2012 | Pasquero | |
| 2013/0017814 A1* | 1/2013 | Ali et al. | 455/418 |
| 2013/0035141 A1* | 2/2013 | Murakami et al. | 455/566 |
| 2013/0225127 A1* | 8/2013 | Cavacuiti et al. | 455/411 |
| 2013/0229277 A1* | 9/2013 | Liao | 340/501 |
| 2013/0324081 A1* | 12/2013 | Gargi et al. | 455/411 |

OTHER PUBLICATIONS

International Search Report and Written Opinion from International Application No. PCT/US2014/046659, mailed Oct. 10, 2014 13 pp.

* cited by examiner

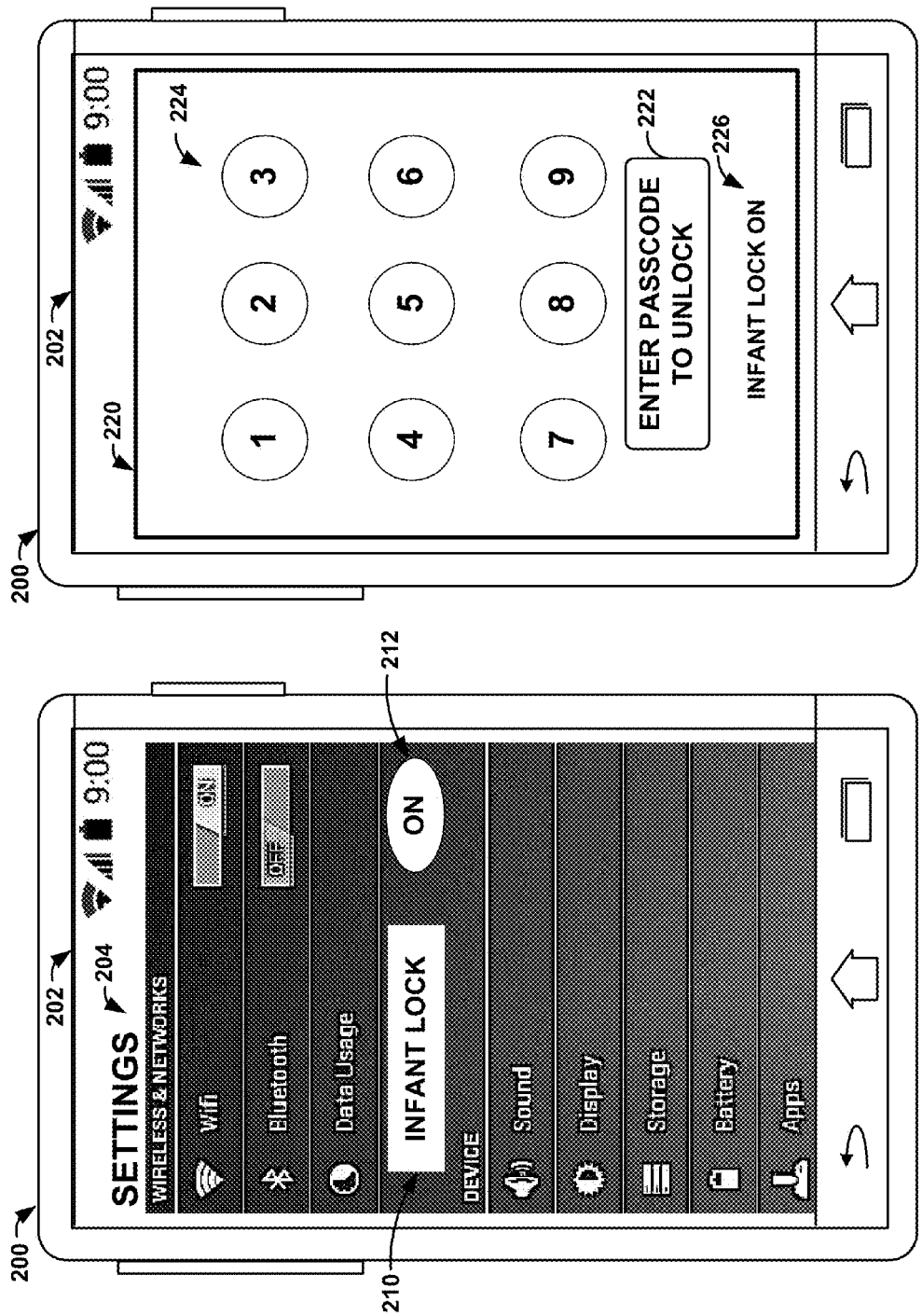

LIMITED-ACCESS STATE FOR INADVERTENT INPUTS

RELATED APPLICATION

This application claims the benefit of U.S. Provisional Application No. 61/860,695, filed Jul. 31, 2013, the entire content of which is incorporated by reference herein.

BACKGROUND

Computing devices (e.g., mobile phones, tablet computers, etc.) can generally perform various functions, such as executing applications stored thereon and outputting information (e.g., documents, e-mails, pictures, etc.) for display (e.g., on a screen). Certain computing devices can include a limited-access state that prevents an unauthorized user from viewing and accessing applications and information stored at the computing device, thereby effectively "locking" the computing device. Such computing devices typically enable a user to provide a specific input (e.g., a passcode, pattern, or biometric information) to unlock the computing device and gain access to the applications or information stored at the computing device. As such, the locking techniques can provide a measure of security to ensure that only users who know the specific input required to unlock the computing device can access information and applications stored at the computing device.

Some computing devices are configured to perform an action in response to receiving greater than a threshold number of unsuccessful unlock attempts. For example, the computing device may prevent additional unlocking attempts for a predetermined amount of time. In some cases, the computing device may delete some or all information stored at the computing device in response to determining that the number of unsuccessful unlock attempts is greater than a threshold number. Thus, in some instances, information may be unintentionally deleted from the computing device.

SUMMARY

In one example, the disclosure is directed to a method including receiving, by a computing device operating in a first limited-access state, an indication of a first input. Responsive to determining that at least one value exceeds a predetermined characteristic threshold, the method also includes transitioning the computing device from operating in the first limited-access state to operating in a second limited-access state, wherein the second limited-access state is different from the first limited-access state. The method further includes outputting, by the computing device while operating in the second limited-access state and for display, instructions for transitioning the computing device from operating in the second limited-access state to operating in the first limited-access state. The method also includes receiving, by the computing device while operating in the second limited-access state, an indication of a second input. Responsive to determining that the indication of the second input satisfies a threshold of compliance with the instructions for transitioning the computing device from operating in the second limited-access state to operating in the first limited-access state, the method further includes transitioning, by the computing device, from operating in the second limited-access state to operating in the first limited-access state.

In another example, the disclosure is directed to a computing device comprising a presence-sensitive input device and one or more processors. While the computing device is operating in a first limited-access state, the one or more processors are operable to receive an indication of a first input detected by the presence-sensitive input device. Responsive to determining that at least one value exceeds a predetermined characteristic threshold, the one or more processors are further operable to transition the computing device from operating in the first limited-access state to operating in a second limited-access state, wherein the second limited-access state is different from the first limited-access state. The one or more processors are further operable to output, while the computing device is operating in the second limited-access state, instructions for transitioning the computing device from operating in the second limited-access state to operating in the first limited-access state. While the computing device is operating in the second limited-access state, the one or more processors are further operable to receive an indication of a second input. Responsive to determining that the indication of the second input satisfies a threshold of compliance with the instructions for transitioning the computing device from operating in the second limited-access state to operating in the first limited-access state, transition the computing device from operating in the second limited-access state to operating in the first limited-access state.

In another example, the disclosure is directed to a computer-readable storage medium encoded with instructions that, when executed by one or more processors of a computing device, cause the one or more processors to receive, while the computing device is operating in a first limited-access state, an indication of a first input. Responsive to determining that at least one value exceeds a predetermined characteristic threshold, the instructions further cause the one or more processors to transition the computing device from operating in the first limited-access state to operating in a second limited-access state, wherein the second limited-access state is different from the first limited-access state. The instructions further cause the one or more processors to output, while the computing device is operating in the second limited-access, instructions for transitioning the computing device from operating in the second limited-access state and receive an indication of a second input. Responsive to determining that the indication of the second input satisfies a threshold of compliance with the instructions for transitioning the computing device from operating in the second limited-access state to operating in the first limited-access state, the instructions further cause the one or more processors to transition the computing device from operating in the second limited-access state to operating in the first limited-access state.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIGS. 4A-4D are conceptual diagrams illustrating a series of example graphical user interfaces for a mobile computing device that is configured to provide a second limited-access state, in accordance with one or more techniques of the present disclosure.

DETAILED DESCRIPTION

Techniques of this disclosure are directed to managing access states of a computing device. In some implementations, a computing device may operate in a first limited-access state (e.g., a first "locked" state). While operating in the first limited-access state, the computing device may be configured to compare received user input to a specific input required to transition the computing device to operating in an access state (e.g., an "unlocked" state). Responsive to receiving user input that does not correspond to the specific user input required to unlock the computing device, the computing device may switch from operating in the first limited-access state to operating in a second limited-access state. For example, in response to determining that the received user input is most likely not an attempt to unlock the computing device from the first limited-access state, the computing device may be configured to switch to operating in the second limited-access state.

In some implementations, the computing device, while in the second limited-access state, can output, for display at a presence-sensitive display, a lock screen graphical user interface that provides an indication of user input required to transition the device from operating in the second limited-access state to operating in another access state, such as the first limited-access state or a full access state. While operating in the second limited-access state, the computing device may disregard received input that does not correspond to the indicated user input as unintentional user inputs instead of processing the user inputs as attempts to unlock the device (i.e., transition the device from operating in the first limited-access state to operating in the access state). By configuring a computing device to differentiate between attempts to unlock the computing device and other user input, techniques of this disclosure may reduce the likelihood that the computing device will perform an action (e.g., erasing all or a portion of the information stored at the computing device) in response to receiving user input while the computing device is operating in the first limited-access state.

Figure 1:
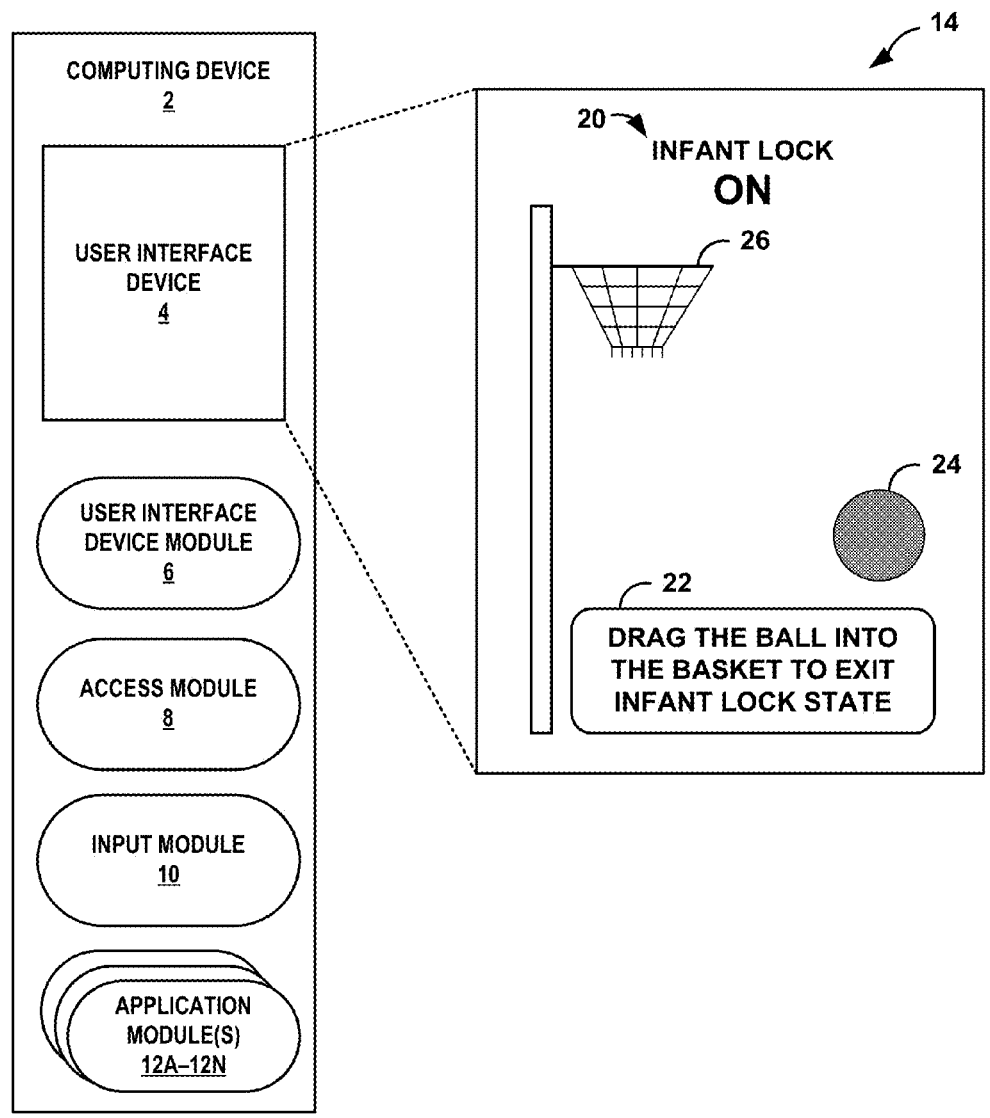
FIG. 1 is a conceptual diagram illustrating an example computing device that is configured to operate in a limited-access state responsive to determining that a characteristic of a user input satisfies a threshold, in accordance with one or more aspects of the present disclosure.

FIG. 1 is a conceptual diagram illustrating an example computing device 2 that is configured to operate in a limited-access state responsive to determining that a characteristic of a user input satisfies a threshold, in accordance with one or more aspects of the present disclosure. In the example of FIG. 1, computing device 2 is illustrated as a mobile computing device. However, in other examples, computing device 2 may be a desktop computer, a mainframe computer, tablet computer, a personal digital assistant (PDA), a laptop computer, a portable gaming device, a portable media player, an e-book reader, a watch, television platform, or another type of computing device.

As shown in FIG. 1, user interface 14 indicates that computing device 2 is operating in the second limited-access state. Thus, in this example, computing device 2 has previously determined that at least one value of a characteristic of a received user input exceeded a characteristic threshold and has transitioned from a first limited-access state (e.g., a locked state) to the second limited-access state (e.g., an infant lock state). FIG. 1 is discussed in terms of computing device 2 operating in the second limited-access state.

Computing device 2 may operate in a locked state that requires some input, such as a passcode, to unlock one or more features of computing device 2. While operating in the locked state, computing device 2 prevents an unauthorized user from accessing features of computing device 2 while operating in the locked state unless computing device 2 receives input data that satisfies an unlocking condition, such as input corresponding to a correct passcode. However, there may be circumstances where computing device 2 receives input that is not intended to unlock computing device 2 from the locked state. Such circumstances may be, for example, when computing device 2 is being stored, transported (for example, in a user's pocket or bag), or held by a small child or animal. In these circumstances, techniques described herein provide computing device 2 with a feature to determine when received user input is characteristic of inputs that are not intended to unlock computing device 2.

For example, computing device 2, which may be a mobile phone, may be operating in the locked state when an infant plays with it. For example, computing device 2 may be picked up by an infant while unattended by an adult. Computing device 2 may be played with by the infant in a manner that shakes computing device 2. Computing device 2 may receive seemingly haphazard interactions with a presence-sensitive device or buttons of computing device 2 while the infant is playing with it. According to techniques described herein, while computing device 2 is operating in the locked state and determines that at least one value of a characteristic of the received input exceeds a characteristic threshold (for example, indicating that computing device 2 is being played with by an infant or pet), computing device 2 transitions to operating in the second limited-access state. As used herein, for illustrative purposes only, the second limited-access state may be referred to generally as an "infant lock" state. Computing device 2 remains operating in the second limited-access state until it receives input data that satisfies an unlocking condition of the second limited-access state, according to various techniques of this disclosure. The techniques described may reduce or prevent computing device 2 from disabling or altering itself when it receives input not corresponding to an unlock condition of a locked state. As used herein, the term "inadvertent input" refers to input computing device 2 receives that is determined to have a characteristic that exceeds a characteristic threshold and that does not unlock a limited-access state.

In some examples, computing device 2 is configured to execute an additional security feature wherein computing device 2 performs an action after an unlocking threshold is reached. An example unlocking threshold may be a predetermined total number of failed attempts at unlocking computing device 2. Another example unlocking threshold may be a number of failed attempts to unlock computing device 2 within a specific time period. Computing device 2 may determine that received user input corresponds to one or more attempts to unlock computing device 2. Computing device 2 may perform actions responsive to the unlocking threshold being reached including preventing computer device 2 from being unlocked at all (e.g., computing device 2 is not operating in the access state) for a time period or deleting information stored at computing device 2. In some examples, according to various techniques of this disclosure, computing device 2 may operate in the second limited-access state, wherein computing device 2 does not take any action after an unlocking threshold is reached while computing device 2 is operating in the second limited-access state.

When computing device 2 is operating in the second limited-access state, computing device 2 may output, for display, an indication of instructions that detail how to unlock computing device 2 from the second limited-access state. For example, computing device 2 may request to receive a particular input, such as interaction with two specified locations of a presence-sensitive input device coupled to or part of computing device 2, in order to unlock the second limited-access state. These instructions may be readily understood by an authorized user of computing device 2, such as an adolescent or adult, but may not be understood by an infant or pet. Thus, computing device 2 may be relatively easily unlocked from the second limited-access state by any person who can understand the instructions computing device 2 outputs for unlocking the second limited-access state. As used in this disclosure, "unlocking the second limited-access state" may refer to transitioning the computing device from operating in the second limited-access state to operating in the first, or another, limited-access state. Computing device 2 ignoring incorrect inputs while operating in the second limited-access state prevents someone who does not understand how to operate computing device 2 from affecting it.

The techniques described herein assure that computing device 2 will not process received inadvertent inputs as unlocking inputs and trigger a protective action. Rather than preventing itself from being unlocked until a time period lapses, disabling itself, or deleting sensitive information after receiving so many inputs that do not unlock computing device 2, the techniques may enable computing device 2, while operating in the first limited-access state, to transition to operating in a second limited-access state in response to receiving an indication of input that has a characteristic that exceeds a threshold. The second limited-access state may reduce anxiety and inconvenience in a user when computing device 2 is in a circumstance where inputs that correlate with inputs not satisfying an unlocking condition are received, such as when an infant is handling computing device 2. In certain examples, according to various techniques of this disclosure, computing device 2 may be configured to switch to operating in a second lock state in response to receiving indication of input that has at least one characteristic that exceeds at least one threshold while computing device 2 is operating in a first locked state. When computing device 2 is unlocked from the second limited-access state, computing device 2 transitions to operating in the first limited-access state.

Configuring computing device 2 according to techniques described herein can prevent computing device 2 from taking actions based on inputs not likely to unlock computing device 2 by an otherwise authorized user. For example, computing device 2 may be played with by an infant and receive inadvertent input from the infant. Locking techniques may prevent computing device 2 from performing various actions in response to detecting user input that has a characteristic exceeding a threshold (e.g., when a user accidentally presses a button, shakes computing device 2, taps a touch screen, or haphazardly activates a presence-sensitive display, such as while computing device 2 is held by an infant or in a user's pocket). The techniques of this disclosure also provide mechanisms for computing device 2 to be readily unlocked by an authorized user or a literate person while operating in the second limited-access state.

As shown in FIG. 1, computing device 2 includes a user interface device (UID) 4. UID 4 of computing device 2 may function as an input device and as an output device for computing device 2. UID 4 may be implemented using various technologies. For instance, UID 4 may function as an input device using a presence-sensitive display, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. UID 4 may function as an output device using any one or more of a liquid crystal display (LCD), plasma display, dot matrix display, light emitting diode (LED) display, organic light-emitting diode (OLED) display, electronic ink, or similar monochrome or color display capable of outputting visible information, such as to a user of computing device 2.

UID 4 of computing device 2 may include a presence-sensitive display that may receive both tactile and motion-based input from, for example, a user of computing device 2. UID 4 may receive indications of the tactile user input by detecting one or more tap and/or non-tap gestures from a user of computing device 2 (e.g., the user touching or pointing to one or more locations of UID 4 with a finger or a stylus pen or the user holding computing device 2 by touching UID 4). The presence-sensitive display of UID 4 may present output to a user. UID 4 may present the output as a user interface which may be related to functionality configured into computing device 2. For example, UID 4 may present various user interfaces of applications (e.g., an electronic message application, an Internet browser application, etc.) executing at computing device 2. A user of computing device 2 may interact with one or more of these applications to perform a function with computing device 2 through the respective user interface of each application.

Computing device 2 may include user interface device (UID) module 6, access module 8, input module 10, and application modules 12A-12N (collectively referred to herein as "application modules 12"). Modules 6, 8, 10, and 12 may perform operations described using software, hardware, firmware, or a mixture of both hardware, software, and firmware residing in and executing on computing device 2. Computing device 2 may execute modules 6, 8, 10, and 12 with multiple processors. Computing device 2 may execute modules 6, 8, 10, and 12 as a virtual machine executing on underlying hardware.

UID module 6 may cause UID 4 to present lock screen graphical user interface 14 (referred to herein as "user interface 14") while computing device 2 operates in a limited-access state. User interface 14 includes graphical elements 20, 22, 24, and 26 displayed at various locations of UID 4. FIG. 1 illustrates an example user interface 14 providing an indication that computing device 2 is operating in a second limited-access state, referred to in this example as infant lock.

User interface 14 includes graphical elements 20, 22, 24, and 26 that are related to unlocking computing device 2 when computing device 2 operates in one of the limited-access states. In this example, user interface 14 includes graphical element 20, which indicates that that computing device 2 is operating in the second limited-access state (e.g., that the infant lock is turned on). Further, in this example, user interface 14 includes graphical element 22 that provides instructions indicating how to exit the infant state and access the first limited-access state. In one example, graphical element 22 is an instruction graphical element that provides text-based instructions describing how to interact with the interactive graphical element to transition the computing device from operating in the second limited-access state to operating in the first limited-access state. User interface 14 also includes graphical elements 24 and 26 that may be interacted with to satisfy an unlocking condition for the infant lock. As described in more detail below, computing device 2 may receive an indication of user input related to a gesture detected at a location of the presence-sensitive device of UID 4. Based on the user input, computing device 2 received while operating in the infant lock state, computing device 2 may switch to the first limited-access state or transition to another state that allows access to information and applications stored at or otherwise accessible by computing device 2.

UID module 6 may act as an intermediary between various components of computing device 2 to make determinations based on input detected by UID 4 and to generate output presented by UID 4. For instance, UID module 6 may receive, as an input from input module 10, an indication of user input received at user interface 14. UID module 6 may receive, as an input from input module 10, a sequence of touch events generated from user input detected at UID 4. UID module 6 may determine, based on the location components in the sequence touch events, which of one or more location components approximate a selection of one or more graphical elements (e.g., UID module 6 may determine the location of one or more of the touch events corresponds to an area of UID 4 that presents graphical elements 24 and 26 used in unlocking infant lock). UID module 6 may transmit, as output to access module 8, the sequence of touch events received from input module 10, along with locations where UID 4 presents each of the graphical elements. In response, UID module 6 may receive, as an input from access module 8, instructions for updating user interface 14 based on the indication of user input received at user interface 14. UID module 6 may update user interface 14 to reflect the access state of computing device 2. UID module 6 may cause UID 4 to present an updated user interface 14.

Input module 10 of computing device 2 may receive an indication of a user input detected by computing device 2 and determine, based on the received indication, a type and a characteristic of the user input. For example, computing device 2 may receive various types of user inputs, such as a gesture input, detected by a presence-sensitive display of UID 4, a button input, detected by push button or a physical switch of computing device 2, and a sensor input, detected by a sensor of computing device 2 (e.g., an accelerometer, a gyro, a proximity sensor, an ambient light sensor, a compass, a barometer, etc.).

Input module 10 may determine a characteristic for each type of input. For example, a characteristic of a gesture input detected by a presence-sensitive display may include a length component, a velocity component, an area of contact component, a start location component, and an end location component. A characteristic of a button input detected by a physical switch may include the state of the switch (e.g., on, off, in-between, etc.). A characteristic of a sensor input detected by a sensor may include an acceleration of computing device 2, an orientation of computing device 2, a physical distance of an object away from computing device 2, a luminance of light surrounding computing device 2, an ambient pressure reading around computing device 2, and the like. Input module 10 may receive information about an indication of a user input that computing device 2 receives and determine a characteristic of the user input based on the information and the type of user input. Furthermore, input module 10 may determine a value for the characteristic of the user input.

Input module 10 may determine whether the user input corresponds to a gesture performed at the presence-sensitive display of UID 4 based on the indication of user input (e.g., after a user swipes and/or taps a finger or a stylus pen at a location of the presence-sensitive display of UID 4). Generally, each time UID 4 receives an indication of user input detected at a location of the presence-sensitive display, input module 10 may receive information about the user input from UID 4. Input module 10 may assemble the information received from UID 4 into a time-ordered sequence of touch events. Each touch event in the sequence may include data or components that represents parameters (e.g., when, where, or originating direction) characterizing a presence and/or movement of input at the presence-sensitive display. Each touch event in the sequence may include a location component corresponding to a location of user interface 14, a time component related to when UID 4 detected user input at the location, and an action component related to whether the touch event corresponds to, for example, a lift up from or a push down at the location. Input module 10 may determine a characteristic of the gesture user input, such as a start location, a length, a velocity, an acceleration, a tapping frequency, a shape, and the like.

Input module 10 may determine one or more characteristics of the user input based on the sequence of touch events and include information about these one or more characteristics within each touch event in the sequence of touch events. For example, input module 10 may determine a start location of the user input, an end location of the user input, a density of a portion of the user input, an area of a portion of the user input, a speed of a portion of the user input, a direction of a portion of the user input, and a curvature of a portion of the user input. One or more touch events in the sequence of touch events may include (in addition to a time, a location, and an action component as described above) a characteristic component that includes information about one or more characteristics of the user input (e.g., a density, a speed, thickness, etc.). Input module 10 may transmit, as output to UID module 6, the sequence of touch events including the components or parameterized data associated with each touch event.

Input module 10 may receive information from a button or a physical switch of computing device 10 about an indication of a user input and determine the user input corresponds to a button input detected by a push button or a physical switch of computing device 10. Input module 10 may determine a characteristic of the button input, such as a physical switch state (e.g., on, off, etc.).

Input module 10 may receive information about an indication of a user input from a sensor of computing device 2 and determine the user input corresponds to a sensor input detected by a sensor of computing device 2. Input module 10 may determine a characteristic of the sensor user input, such as an acceleration reading from an accelerometer (e.g., when the user shakes computing device 2), an orientation reading from a gyro (e.g., when a user changes the orientation of computing device 2 from portrait to landscape orientation), an ambient light measurement from an ambient light sensor (e.g., when a user removes computing device 2 from a pocket), a physical distance reading from a proximity sensor between an object (e.g., a hand of a user) and computing device 2, and a barometric pressure reading from a barometer.

Access module 8 may control access to applications and information stored on computing device 2. For example, while computing device 2 operates in a limited-access state, UID module 6 may cause UI device 4 to present user interface 14. Access module 8 of computing device 2 may transmit, as output to UID module 6 an indication of the access state that computing device 2 is operating in. UID module 6 may instruct UID 4 to update user interface 14 based on the current access state of computing device 2.

Access module 8 may determine, based on user input detected by input module 10, whether to cause computing device 2 to exit a limited-access state or to remain in the limited-access state. For example, input module 10 may determine from information received by UID 4 that the user input represents a gesture. Input module 10 may determine that a start location of the gesture corresponds to a location at the presence-sensitive display of UID 4 that corresponds to graphical elements 24 or 26. Based on the start location of the gesture and a characteristic of the gesture determined by input module 10, access module 8 may determine that the gesture represents a user input to unlock computing device 2 from the limited-access state (for example, infant lock state). When access module 8 determines that the user input satisfies an unlocking condition of the second limited-access state, access module 8 causes computing device 2 to transition to operating in the first limited-access state.

Once computing device 2 is operating in the first limited-access state, access module 8 may cause computing device 2 to either transition back to the second limited-access state or exit the first limited-access state from which the user can access protected information and applications stored on computing device 10, based at least in part on additional user input detected by input module 10 while computing device 2 is operating in the first limited-access state.

Conversely, input module 10 may determine the user input corresponds to input at a location at the presence-sensitive display of UID 4 other than a location where user interface 14 presents unlock graphical elements 24 and 26. Access module 8 may determine that the input does not satisfy an unlocking condition that is required to unlock computing device 2 from the second limited-access state. In response to such a determination, access module 8 may cause computing device 2 to remain in the second limited-access state, wherein the user cannot provide an input to unlock computing device 2 from the first limited-access state in order to access protected information and applications stored on computing device 2.

Computing device 2 may further include one or more application modules 12-1 through 12-N. Application modules 12 may include any other application that computing device 2 may execute in addition to the other modules specifically described in this disclosure. For example, application modules 12 may include a web browser, a media player, a file system, a map program, or any other number of applications or features that computing device 2 may execute.

In the example of FIG. 1, computing device 2 outputs for display an unlock user interface 14 for display at a presence-sensitive display. As described above, FIG. 1 illustrates an example user interface 14 that provides graphical elements indicating that computing device 2 is operating in a second limited-access state, shown in FIG. 1 as an infant lock state. UID module 6 may generate user interface 14 and include graphical elements 20, 22, 24, and 26 in user interface 14. UID module 6 may send information to UID 4 that includes instructions for displaying user interface 14 at a presence-sensitive device of UID 4. UID 4 may receive the information and cause the presence-sensitive device of UID 4 to present user interface 14 including unlock graphical elements 24 and 26, indication graphical element 20, indicating the access state computing device 2 is currently operating in, and instructions graphical element 22 that provides instructions for transitioning computing device from operating in the second limited-access state to operating in the first limited-access state.

While computing device 2 presents user interface 14, input module 10 of computing device 2 may receive information from computing device 2 about an indication of a user input received by computing device 2. Based on information about the user input, input module 10 may determine at least one characteristic of the user input. Input module 10 may further determine a value of the at least one characteristic of the user input.

For example, based on the information about the user input received from computing device 2, input module 10 may determine the user input represents a gesture detected by UID 4 at a location on the presence-sensitive device of UID 4. Input module 10 may determine a characteristic of the user input. The characteristic of the user input may include several properties that characterize the user input, such as a length of the user input (e.g., equivalent to a distance equal to two-thirds of the width of the presence-sensitive display of UID 4), a shape of the user input (e.g., a horizontal linear shape), a velocity of the user input (e.g., a ratio of the length of the user input and an duration of time associated with the user input), an area of the user input (e.g., a geometric area the gesture is contacting the presence-sensitive display of UID 4), or the like.

Although FIG. 1 illustrates an example of computing device 2 operating in the second limited-access state, while computing device 2 is operating in the first limited-access state, computing device 2 may use the characteristic of the user input to differentiate accidental user input from intentional user input. Computing device 2 may update user interface 14 upon detection of user input that has a value of a characteristic that does not satisfy a threshold characteristic (e.g., user input is presumed to be intended to unlock computing device 2), but may not update user interface 14 upon the detection of user input that has a value of a characteristic that satisfies the threshold characteristic (e.g., user input is presumed to not be intended to unlock computing device 2). To identify intentional user input versus accidental user input, UI module 10 may compare the characteristic of the user input to a threshold and, if the characteristic satisfies the threshold, computing device 2 may determine the user input represents intentional user input.

For example, in the case of a gesture user input, the threshold may include one or more categorical thresholds (e.g., components) that correspond to different aspects of a characteristic of a user input. The threshold may include a start location component (e.g., corresponding to a location at the presence-sensitive device of UID 4 that represents graphical elements), a shape component (e.g., a common linear plane between eighty percent of each of the location components in the sequence of motion events), a velocity component (e.g., fifty percent of the screen width divided by a half second), a length component (e.g., fifty percent of the width of the presence-sensitive display of UID 4), and an acceleration component (e.g., a positive acceleration, a value of +1, etc.).

Each threshold component may represent a value that UI module 10 can compare the characteristic of the user input against to determine whether the characteristic of the user input satisfies or exceeds the threshold. For instance, UI module 10 may determine the start location of the user input approximately corresponds to the location component of the threshold, for instance, if the location of the user input is within an unlocking graphical element. UI module 10 may determine the length of the user input satisfies the length component of the threshold. UI module 10 may determine the velocity of the user input satisfies the velocity component of the threshold, etc. UI module 20 may determine the characteristic of the user input satisfies (e.g., exceeds) each component of the threshold. In response, UI module 20 may determine, based on the characteristic of the user input, that the characteristic satisfies the threshold.

To enable computing device 2 to transition from the infant lock to the locked state, access module 8 may require that the characteristic of the user input satisfies the threshold. This requirement may require a user to provide a user input with a specific area, location, length, intensity, momentum, inertia, or force before computing device 2 transitions. In response to determining that the characteristic satisfies the threshold, access module 8 may cause computing device 2 to transition to the first limited-access state and cause UID 4 to update user interface 14 to indicate computing device 2 is operating in the first limited-access state. For example, if UID module 6 determines the characteristic of the gesture input represents an intentional user input with a start location, a length, a shape, a velocity, and an acceleration that satisfy each respective component of the unlocking condition, access module 8 may cause UID 4 to present user interface 14 by indicating computing device 2 is operating in the first limited-access state. In an example where access module 8 did not determine that the user input satisfied an unlocking condition to unlock computing device 2, UID module 6 may continue to cause UID 4 to output lock screen graphical interface 14 indicating that computing device 2 is operating in the second limited-access state.

In the example of FIG. 1, instruction graphical element 22 instructs a user to "drag the ball into the basket to exit infant lock mode." As shown herein, unlocking graphical elements 24 and 26 are the ball and basket, respectively. A literate user, fluid in the language used at user interface 14, most likely would be able to unlock the infant lock based on the instructions given in instruction graphical element 22. In order to unlock computing device 2 from infant lock, any user input that satisfies an unlocking condition corresponding to the instructions given in instruction graphical element 22 should unlock infant lock. For example, UID 4 receives a swipe gesture that originates at user interface 14 near or at ball 24 and passes near or at basket 26 may cause access module 8 to unlock computing device 2 from the infant lock state. Computing device 2 may remain unresponsive to most any other input that does not satisfy the unlocking condition. In other examples, other illustrations, requirements, and mechanisms for unlocking computing device 2 from the second limited-access state are used.

In this way, the techniques of the disclosure may enable a computing device to transition from a first limited-access state to a second limited-access state wherein received user inputs are not processed as attempts to unlock the computing device from the first limited-access state. The techniques of the disclosure may prevent the computing device from taking actions based on inadvertent inputs by an otherwise authorized user. The techniques may further enable a user to activate the secondary limited-access state feature. Locking techniques may prevent the computing device from performing various actions in response to detecting accidental user input (e.g., when a user accidentally presses a button, shakes the computing device, taps a touch screen, or inadvertently activates a presence-sensitive display while the computing device is held by an infant or in a user's pocket). A computing device such as this may allow an authorized user of the computing device to relax in situations where the computing device receives inadvertent or haphazard user input while it is operating in a locked state.

Figure 2:
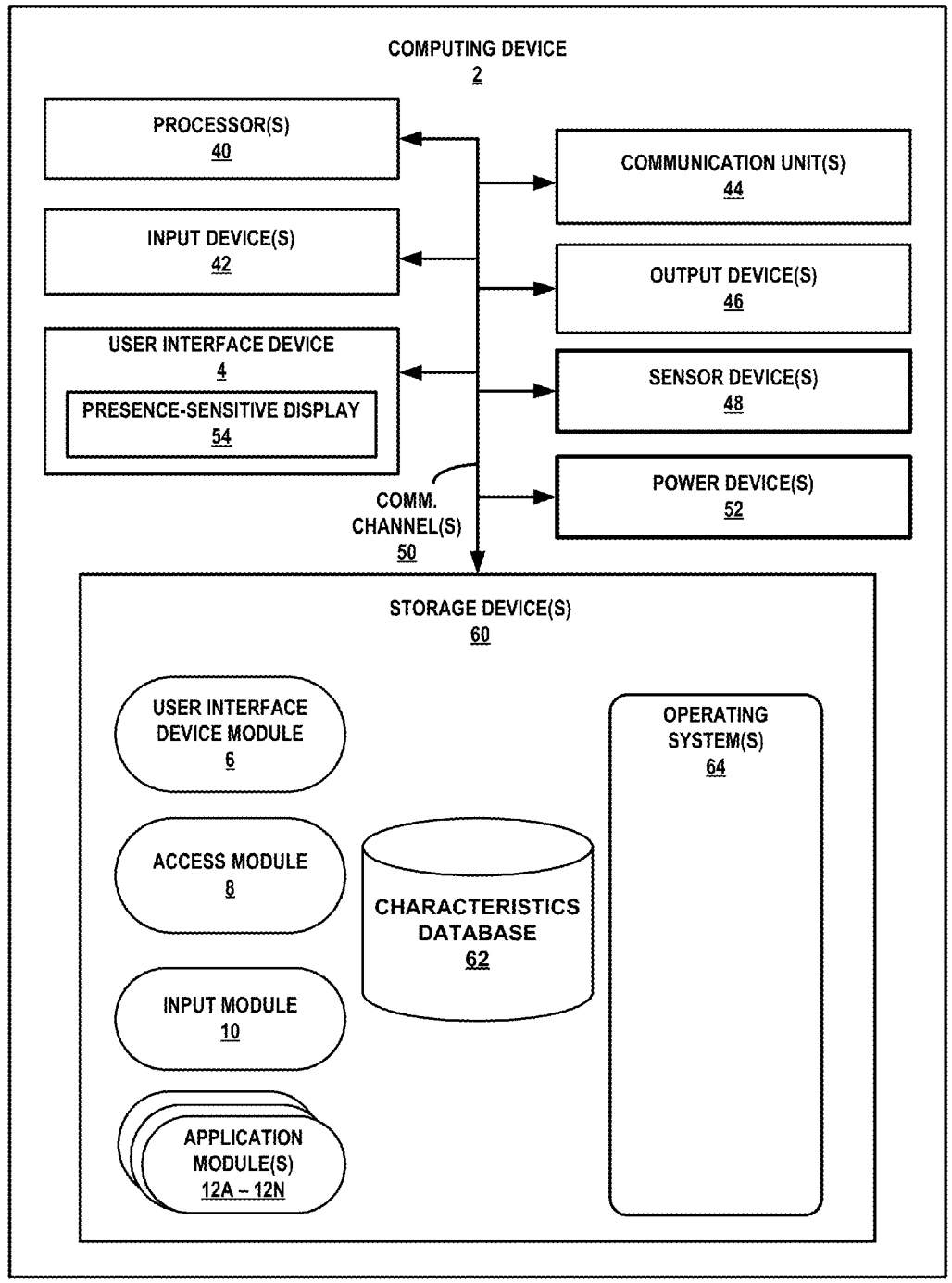
FIG. 2 is a block diagram illustrating an example computing device configured to provide a second limited-access state, in accordance with one or more aspects of the present disclosure.

FIG. 2 is a block diagram illustrating an example computing device configured to provide a second limited-access state, in accordance with one or more aspects of the present disclosure. Computing device 2 of FIG. 2 is described below within the context of FIG. 1. FIG. 2 illustrates only one particular example of computing device 2, and many other examples of computing device 2 may be used in other instances. Other examples of computing device 2 may include a subset of the components included in example computing device 2 or may include additional components not shown in FIG. 2.

As shown in the example of FIG. 2, computing device 2 includes user interface device 4 ("UID 4"), one or more processors 40, one or more input devices 42, one or more communication units 44, one or more output devices 46, one or more sensors 48, one or more power sources 52, and one or more storage devices 60. Storage devices 60 of computing device 2 also include UID module 6, keyboard module 8, input module 10, application modules 12A-12N, characteristics database 62, and one or more operating systems 64. One or more communication channels 50 may interconnect each of the components 4, 40, 42, 44, 46, 48, 52, and 60 for inter-component communications (physically, communicatively, and/or operatively). In some examples, communication channels 50 may include a system bus, a network connection, an inter-process communication data structure, or any other method for communicating data.

One or more input devices 42 of computing device 2 may receive input. Examples of input are tactile, motion, audio, and video input. Input devices 42 of computing device 2, in one example, includes a presence-sensitive display, touch-sensitive screen, mouse, keyboard, voice responsive system, video camera, microphone or any other type of device for detecting input from, for example, a human or machine.

One or more output devices 46 of computing device 2 may generate output. Examples of output are tactile, audio, and video output. Output devices 46 of computing device 2, in one example, includes a presence-sensitive display, speaker, cathode ray tube (CRT) monitor, liquid crystal display (LCD), motor, actuator, electromagnet, piezoelectric sensor, or any other type of device for generating output to a human or machine. Output devices 46 may utilize one or more of a sound card or video graphics adapter card to produce auditory or visual output, respectively.

One or more communication units 44 of computing device 2 may communicate with external devices via one or more networks by transmitting and/or receiving network signals on the one or more networks. The one or more networks may be, for example, the Internet. Computing device 2 may use communication unit 44 to transmit and/or receive radio signals on a radio network such as a cellular radio network. Likewise, communication units 44 may transmit and/or receive satellite signals on a Global Navigation Satellite System (GNNS) network such as the Global Positioning System (GPS). Examples of communication unit 44 include a network interface card (e.g., an Ethernet card), an optical transceiver, a radio frequency transceiver, a GPS receiver, or any other type of device that can send or receive information. Other examples of communication units 44 may include Bluetooth®, GPS, 3G, 4G, and Wi-Fi® radios found in mobile devices as well as Universal Serial Bus (USB) controllers.

Computing device 2 also includes UID 4, which may include functionality of one or more input devices 42 and/or output devices 46. In the example of FIG. 2, UID 4 may be or may include a presence-sensitive display 54. In some examples, presence-sensitive display 54 may detect an object at and/or near presence-sensitive display 54. As one example range, presence-sensitive display 54 may detect an object, such as a finger or stylus that is within 5 centimeters or less of presence-sensitive display 54. Presence-sensitive display 54 may determine a location (e.g., an (x,y) coordinate) of presence-sensitive display 54 at which the object was detected. In another example range, presence-sensitive display 54 may detect an object 15 centimeters or less from presence-sensitive display 54 and other ranges are also possible. Presence-sensitive display 54 may determine the location of presence-sensitive display 54 selected by a user's finger using capacitive, inductive, and/or optical recognition techniques. In some examples, presence-sensitive display 54 provides output to a user using tactile, audio, or video stimuli as described with respect to output device 46. In the example of FIG. 2, UID 4 presents a user interface (such as user interface 14 of FIG. 1) at presence-sensitive display 54 of UID 4.

While illustrated as an internal component of computing device 2, UID 4 also represents an external component that shares a data path with computing device 2 for transmitting and/or receiving input and output. For instance, in one example, UID 4 represents a built-in component of computing device 2 located within and physically connected to the external packaging of computing device 2 (e.g., a screen on a mobile phone). In another example, UID 4 represents an external component of computing device 2 located outside and physically separated from the packaging of computing device 2 (e.g., a monitor, a projector, etc. that shares a wired and/or wireless data path with a tablet computer).

One or more sensor devices 48 of computing device 2 may detect input, which may be user input. Example sensor devices 48 include an accelerometer, a gyroscope, an ambient light sensor, a proximity sensor, a barometer, magnetometer, or other sensor devices. Computing device 2 may include one or more of each sensor device. User input detected by sensor devices 48 may include data related to acceleration, orientation, light intensity, proximity of an object to computing device 2, an ambient pressure, magnetic field strength and polarity, or other sensor reading. In some examples, sensor devices 48 may be an input device 42. One or more sensor devices 48 may detect user input. For example, an accelerometer may detect changes in acceleration when computing device 2 is shaken by an infant playing with computing device 2. Some determined characteristics of user input detected with one or more sensor devices 48 include at least one of an acceleration of the computing device, an orientation of the computing device, an ambient light measurement within a predefined distance from the computing device, a physical distance between an object and the computing device, and a barometric pressure reading.

Computing device 2 may include one or more power devices 52, which may provide power to computing device 2. In one example, power device 52 includes one or more batteries included in computing device 2. The one or more batteries may be rechargeable and provide power to computing device 2. The one or more batteries may, in some examples, be made from nickel-cadmium, lithium-ion, or other suitable material. In other examples, power device 52 may be a power source capable of providing stored power or voltage from another power source, which may be external to computing device 2.

One or more storage devices 60 within computing device 2 may store information for processing during operation of computing device 2 (e.g., characteristic database 62 of computing device 2 may store data related to characteristics of user inputs and corresponding characteristic threshold information as well as sensor input thresholds, accessed by access module 8 during execution at computing device 2). In some examples, storage device 60 functions as a temporary memory, meaning that storage device 60 is not used for long-term storage. Storage devices 60 on computing device 2 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage devices 60, in some examples, also include one or more computer-readable storage media. Storage devices 60 may be configured to store larger amounts of information than volatile memory. Storage devices 60 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage devices 60 may store program instructions and/or data associated with UID module 6, access module 8, input module 10, and application modules 12.

One or more processors 40 may implement functionality and/or execute instructions within computing device 2. For example, processors 40 on computing device 2 may receive and execute instructions stored by storage devices 60 that execute the functionality of UID module 6, access module 8, input module 10, and application modules 12. These instructions executed by processors 40 may cause computing device 2 to store information within storage devices 60 during program execution. Processors 40 may execute instructions in UID module 6 and access module 8 to cause UID 4 to display user interface 14 with instructions for unlocking a second limited-access state. That is, modules 8 and 6 may be operable by processors 40 to perform various actions, including analyzing received input and sensor data to determine whether computing device 2 should enter the second limited-access state and causing UID 4 to present user interface 14 at presence-sensitive display 12 of UID 4.

In accordance with aspects of this disclosure, computing device 2 of FIG. 2 may output for display at presence-sensitive display 54 of UID 4, a graphical user interface that indicates a current operating state of computing device 2, such as GUI 14 of FIG. 1. For example, during operational use of computing device 2, access module 8 of computing device 2 may determine an operating state of computing device 2. UID module 6 may transmit a display command and data over communication channels 50 to cause UID 4 to a present user interface at presence-sensitive display 54 of UID 4. UID module 6 may send information to UID 4 that includes instructions for displaying user interface 14 at presence-sensitive display 54. UID 4 may receive the display command and data from UID module 6 and cause presence-sensitive display 54 of UID 4 to present a user interface, such as user interface 14 of FIG. 1.

Computing device 2 may receive an indication of user input detected at presence-sensitive display 54 of UID 4. Receiving the indication of user input may comprise receiving an indication of one or more tap gestures detected at presence-sensitive display 54. Alternatively, receiving the indication of a user input detected at presence-sensitive display 54 of UID 4 may comprise receiving an indication of one or more non-tap gestures detected at presence-sensitive display 54. In other words, a user may provide tap and/or non-tap gestures as input to computing device 2 and computing device 2 may receive either type of input as an indication of user input. In some examples, UID module 6 may receive the indication of user input, analyze and interpret the user input, and provide data related to the received indication of user input to other modules of computing device 2, such as input module 10 and access module 8.

Access module 8 may control the operating state of computing device 2. For example, computing device 2 may be operating in one of an open access state, a first limited-access state, and a second limited-access state. Operating states determine access to applications and information stored on computing device 2. Access module 8 may determine, based on user input detected by UID module 6 or one or more sensors 48 and processed by input module 10, what operating state computing device 2 should be in, using an algorithm or intelligence. For example, if computing device 2 has not received any user input for a determined time period and is operating in an open access state, access module 8 may cause computing device 2 to transition to operating in the first limited-access state. When access module 8 determines that computing device 2 has received inadvertent input, access module 8 may transition computing device 2 from operating in the first limited-access state to operating in the second limited-access state.

When access module 8 determines an unlocking condition has been met while computing device 2 is operating in the second limited-access state, access module 8 may transition computing device 2 to operating in the first limited-access state. For example, referring briefly to FIG. 1, access module 8 may receive information from input module 10 that determined that computing device 2 detected an indication of user input that drags graphical element 24 to graphical element 26. Access module 8 may determine that the received indication of user input satisfies an unlocking condition of the second limited-access state. Responsive to determining the unlocking condition is satisfied, access module 8 may cause computing device 2 to transition to operating in the first limited-access state.

Access module 8 may provide instructions for UID module 6 to output, at presence-sensitive display 14, an indication of the current operating state of computing device 2. When computing device 2 is operating in the second limited-access state, access module 8 may further instruct UID module 6 to output, at presence-sensitive display 14, an indication of instructions for unlocking the second limited-access state. Access module 8 may instruct UID module 6 to instruct UID 4 to update user interface 14 based on the current access state of computing device 2.

Input module 10 may receive user data from UID module 6 and one or more sensors 48. Based on the received input data, input module 10 may determine values of one or more characteristics of the user data. Input module 10 may compare the value of each characteristic to a threshold level for that characteristic. When input module 10 determines that the value exceeds the threshold level, input module 10 may provide an indication of the exceeding value to access module 8. Based on the indication of the exceeding value, access module 8 may transition computing device 2 from operating in the first limited-access state to operating in the second limited-access state. In some examples, while computing device 2 is operating in the second limited-access state, input module 10 may continue to receive information related to the indications of user data from UID module 6 and sensors 48. However, input module 10 may not determine if values related to user input exceed the corresponding characteristic thresholds. Rather, input module 10 may determine whether the received user input satisfies an unlocking condition of the second limited-access state. In some examples, access module 8 performs the functions of comparing values of characteristics of user input to the corresponding thresholds.

Characteristics database 62 may be included in one or more storage devices 60 computing device 2. In some examples, characteristics database 62 may be stored externally to computing device 2. In such an example, computing device may access characteristics database 62 accessed remotely. Characteristics database 62 may contain data related to characteristics of user input that computing device 2 may receive or detect. The characteristics may include, for example, characteristic thresholds related to user input received at presence-sensitive display 54. Characteristics of such user input may include a length, area of contact, a speed, tap frequency, number of motion events in a time-ordered sequence of motion events, a starting and stopping position, a tap frequency, etc. of, for example, a gesture. The characteristics may also be related to user data detected with one or more sensor devices 48, such as proximity of an object near computing device 2, an acceleration, an orientation, a magnetic field value, ambient light, and the like.

The data related to characteristics of user input may include characteristic thresholds for possible characteristics of each user input type. For example, characteristics database 62 may include a characteristic threshold for acceleration. The characteristic threshold for acceleration may be any value determined by or set for computing device 2, and the threshold may be such that if the threshold is exceeded, it is likely that the user input is an inadvertent user input. A value exceeding a threshold may mean the value is less than, less than or equal to, greater than or equal to, or greater than the threshold.

For example, the characteristic threshold for acceleration may be set to 4 m/s$^2$. Responsive to an accelerometer sensor device of computing device 2 detecting user input of an acceleration, input module 10 may query characteristics database 62 for a value of the acceleration threshold. Once input module 10 receives the information for the acceleration threshold, input module 10 compares the value of the detected acceleration user input to the threshold. If the detected acceleration exceeds the threshold (e.g., is greater than 4 m/s$^2$), input module 10 may determine that the user input is inadvertent and instruct access module 8 to switch computing device 2 to operating in the second limited-access state.

Thus, input module 10 may determine when a value of a characteristic of received user inputs exceeds a threshold for that characteristic. Responsive to determining the value exceeds the characteristic threshold, input module 10 may instruct access module 8 to set the operating state of computing device 2 to the second limited-access state. While operating in the second limited-access state, computing device 2 ignores inputs that do not satisfy an unlocking condition of the second limited-access state (i.e., inputs that do not unlock the second limited-access state).

Thus, the techniques of the disclosure may enable computing device 2 to transition from a first limited-access state to a second limited-access state in which received user inputs are not processed as attempts to unlock computing device 2 from the first limited-access state. The techniques of the disclosure may prevent computing device 2 from taking actions based on inadvertent inputs, such an infant touching presence-sensitive display 54. The techniques may further enable computing device 2 to provide an option for enabling or disabling the secondary limited-access state feature.

The techniques described herein may prevent computing device 2 from performing various locking out actions in response to receiving inadvertent user input (e.g., from a user accidentally pressing a button, shaking computing device 2, taps presence-sensitive display 54, or inadvertently activates presence-sensitive display 54 while computing device 2 is held by an infant or in a user's pocket). Computing device 2, configured according to techniques described herein, may allow an authorized user of computing device 2 to not worry about computing device 2 deleting data or preventing when computing device 2 receiving receives inadvertent or haphazard user input while it is operating in a locked state.

Figure 3:
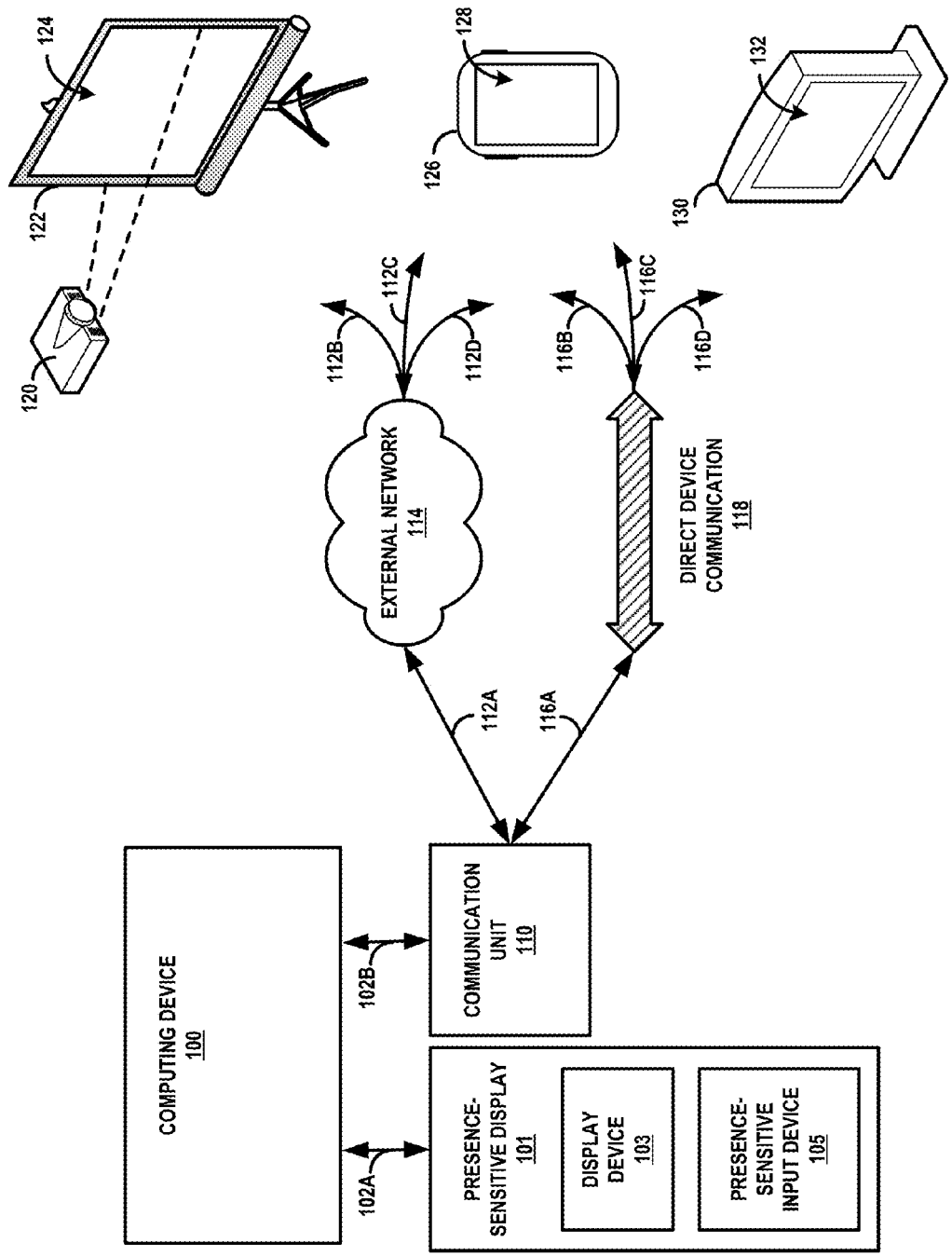
FIG. 3 is a block diagram illustrating an example computing device that outputs graphical content for display at a remote device, in accordance with one or more techniques of the present disclosure.

FIG. 3 is a block diagram illustrating an example computing device 100 that outputs graphical content for display at a remote device, in accordance with one or more techniques of the present disclosure. Graphical content, generally, may include any visual information that may be output for display, such as text, images, a group of moving images, etc. The example shown in FIG. 3 includes a computing device 100, presence-sensitive display 101, communication unit 110, projector 120, projector screen 122, mobile device 126, and visual display device 130. Although shown for purposes of example in FIGS. 1 and 2 as a stand-alone computing device 2, a computing device such as computing device 100 may, generally, be any component or system that includes a processor or other suitable computing environment for executing software instructions and, for example, need not include a presence-sensitive display.

As shown in the example of FIG. 3, computing device 100 may be a processor that includes functionality as described with respect to one or more processors 40 in FIG. 2. In such examples, computing device 100 may be operatively coupled to presence-sensitive display 101 by a communication channel 102A, which may be a system bus or other suitable connection. Computing device 100 may also be operatively coupled to communication unit 110, further described below, by a communication channel 102B, which may also be a system bus or other suitable connection. Although shown separately as an example in FIG. 3, computing device 100 may be operatively coupled to presence-sensitive display 101 and communication unit 110 by any number of one or more communication channels.

In other examples, such as illustrated previously by computing device 2 in FIGS. 1-2, a computing device may refer to a portable or mobile device such as mobile phones (including smart phones), laptop computers, etc. In some examples, a computing device may be a desktop computers, tablet computers, smart television platforms, cameras, personal digital assistants (PDAs), servers, mainframes, etc.

Presence-sensitive display 101, such as an example of user interface device 4 as shown in FIG. 1, may include display device 103 and presence-sensitive input device 105. Display device 103 may, for example, receive data from computing device 100 and display graphical content associated with the data. In some examples, presence-sensitive input device 105 may determine one or more user inputs (e.g., continuous gestures, multi-touch gestures, single-touch gestures, etc.) at presence-sensitive display 101 using capacitive, inductive, and/or optical recognition techniques and send indications of such user input to computing device 100 using communication channel 102A. In some examples, presence-sensitive input device 105 may be physically positioned on top of display device 103 such that, when a user positions an input unit over a graphical element displayed by display device 103, the location at which presence-sensitive input device 105 corresponds to the location of display device 103 at which the graphical element is displayed. In other examples, presence-sensitive input device 105 may be positioned physically apart from display device 103, and locations of presence-sensitive input device 105 may correspond to locations of display device 103, such that input can be made at presence-sensitive input device 105 for interacting with graphical elements displayed at corresponding locations of display device 103.

As shown in FIG. 3, computing device 100 may also include and/or be operatively coupled with communication unit 110. Communication unit 110 may include functionality of one or more communication units 44 as described in FIG. 2. Examples of communication unit 110 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 100 may also include and/or be operatively coupled with one or more other devices, e.g., input devices, output devices, memory, storage devices, and the like, such as those shown in FIGS. 1 and 2.

FIG. 3 also illustrates a projector 120 and projector screen 122. Other such examples of projection devices may include electronic whiteboards, holographic display devices, and any other suitable devices for displaying graphical content. Projector 120 and projector screen 122 may include one or more communication units that enable the respective devices to communicate with computing device 100. In some examples, one or more communication units may enable communication between projector 120 and projector screen 122. Projector 120 may receive data from computing device 100 that includes graphical content. Projector 120, in response to receiving the data, may project the graphical content onto projector screen 122. In some examples, projector 120 may determine one or more user inputs (e.g., continuous gestures, multi-touch gestures, single-touch gestures, etc.) at projector screen using optical recognition or other suitable techniques and send indications of such user input using one or more communication units to computing device 100. In such examples, projector screen 122 may be unnecessary, and projector 120 may project graphical content on any suitable medium and detect one or more user inputs using optical recognition or other such suitable techniques.

Projector screen 122, in some examples, may include a presence-sensitive display 124. Presence-sensitive display 124 may include a subset of functionality or all of the functionality of UI device 4 as described in this disclosure. In some examples, presence-sensitive display 124 may include additional or different functionality. Projector screen 122 (e.g., an electronic whiteboard), may receive data from computing device 100 and display the graphical content. In some examples, presence-sensitive display 124 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

FIG. 3 also illustrates mobile device 126 and visual display device 130. Mobile device 126 and visual display device 130 may each include computing and connectivity capabilities. Examples of mobile device 126 may include e-reader devices, convertible notebook devices, hybrid slate devices, etc. Examples of visual display device 130 may include other semi-stationary devices such as televisions, computer monitors, etc. As shown in FIG. 3, mobile device 126 may include a presence-sensitive display 128. Visual display device 130 may include a presence-sensitive display 132. Presence-sensitive displays 128, 132 may include a subset of functionality or all of the functionality of presence-sensitive display 54 as described in this disclosure. In some examples, presence-sensitive displays 128, 132 may include additional functionality. In any case, presence-sensitive display 132, for example, may receive data from computing device 100 and display the graphical content. In some examples, presence-sensitive display 132 may determine one or more user inputs (e.g., continuous gestures, multi-touch gestures, single-touch gestures, etc.) at projector screen 122 using capacitive, inductive, and/or optical recognition techniques and send indications of such user input using one or more communication units to computing device 100.

As described above, in some examples, computing device 100 may output graphical content for display at presence-sensitive display 101 that is coupled to computing device 100 by a system bus or other suitable communication channel. Computing device 100 may also output graphical content for display at one or more remote devices, such as projector 120, projector screen 122, mobile device 126, and visual display device 130. For instance, computing device 100 may execute one or more instructions to generate and/or modify graphical content in accordance with techniques of the present disclosure. Computing device 100 may output data that includes the graphical content to a communication unit of computing device 100, such as communication unit 110. Communication unit 110 may send the data to one or more of the remote devices, such as projector 120, projector screen 122, mobile device 126, and/or visual display device 130. In this way, computing device 100 may output the graphical content for display at one or more of the remote devices. In some examples, one or more of the remote devices may output the graphical content at a presence-sensitive display that is included in and/or operatively coupled to the respective remote devices.

In some examples, computing device 100 may not output graphical content at presence-sensitive display 101 that is operatively coupled to computing device 100. In other examples, computing device 100 may output graphical content for display at both a presence-sensitive display 101 that is coupled to computing device 100 by communication channel 102A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 100 and output for display at presence-sensitive display 101 may be different than graphical content display output for display at one or more remote devices.

Computing device 100 may send and receive data using any suitable communication techniques. For example, computing device 100 may be operatively coupled to external network 114 using network link 112A. Each of the remote devices illustrated in FIG. 3 may be operatively coupled to network external network 114 by one of respective network links 112B, 112C, and 112D. External network 114 may include network hubs, network switches, network routers, etc., that are operatively inter-coupled thereby providing for the exchange of information between computing device 100 and the remote devices illustrated in FIG. 3. In some examples, network links 112A-112D may be Ethernet, ATM or other network connections. Such connections may be wireless and/or wired connections.

In some examples, computing device 100 may be operatively coupled to one or more of the remote devices included in FIG. 3 using direct device communication 118. Direct device communication 118 may include communications through which computing device 100 sends and receives data directly with a remote device, using wired or wireless communication. That is, in some examples of direct device communication 118, data sent by computing device 100 may not be forwarded by one or more additional devices before being received at the remote device, and vice-versa. Examples of direct device communication 118 may include Bluetooth, Near-Field Communication, Universal Serial Bus, Wi-Fi, infrared, etc. One or more of the remote devices illustrated in FIG. 3 may be operatively coupled with computing device 100 by communication links 116A-116D. In some examples, communication links 116A-116D may be connections using Bluetooth, Near-Field Communication, Universal Serial Bus, infrared, etc. Such connections may be wireless and/or wired connections.

In accordance with techniques of the disclosure, computing device 100 may be operatively coupled to visual display device 130 using external network 114. For example, computing device 100 may output an unlocking screen for display at presence-sensitive display 132. For instance, computing device 100 may send data that includes a representation of the unlocking screen to communication unit 110. Communication unit 110 may send the data that includes the representation of the unlocking screen to visual display device 130 using external network 114. Visual display device 130, in response to receiving the data using external network 114, may cause presence-sensitive display 132 to output the unlocking screen. In response to a user performing a gesture at presence-sensitive display 132 (e.g., at a region of presence-sensitive display 132 that outputs the unlocking screen), visual display device 130 may send an indication of the gesture to computing device 100 using external network 114. Communication unit 110 of may receive the indication of the gesture, and send the indication to computing device 100.

In response to receiving an indication of at least one gesture detected at a presence-sensitive input device and based on a current operating state, computing device 100 may determine if the gesture has a value of a characteristic that exceeds a threshold. If computing device 100 receives at least one gesture detected at a presence-sensitive input device that has a value of a characteristic that exceeds a threshold while operating in a first limited-access state, computing device 100 may transition to a second limited-access state.

FIGS. 4A-4D are conceptual diagrams illustrating a series of example graphical user interfaces for a computing device 200 that is configured to provide a second limited-access state, in accordance with one or more techniques of the present disclosure. Computing device 200 of FIGS. 4A-4D may be any computing device as discussed above with respect to FIGS. 1-3, including a mobile computing device. Furthermore, computing device 200 may be configured to include any subset of the features and techniques described herein, as well as additional features and techniques.

Figure 4C:
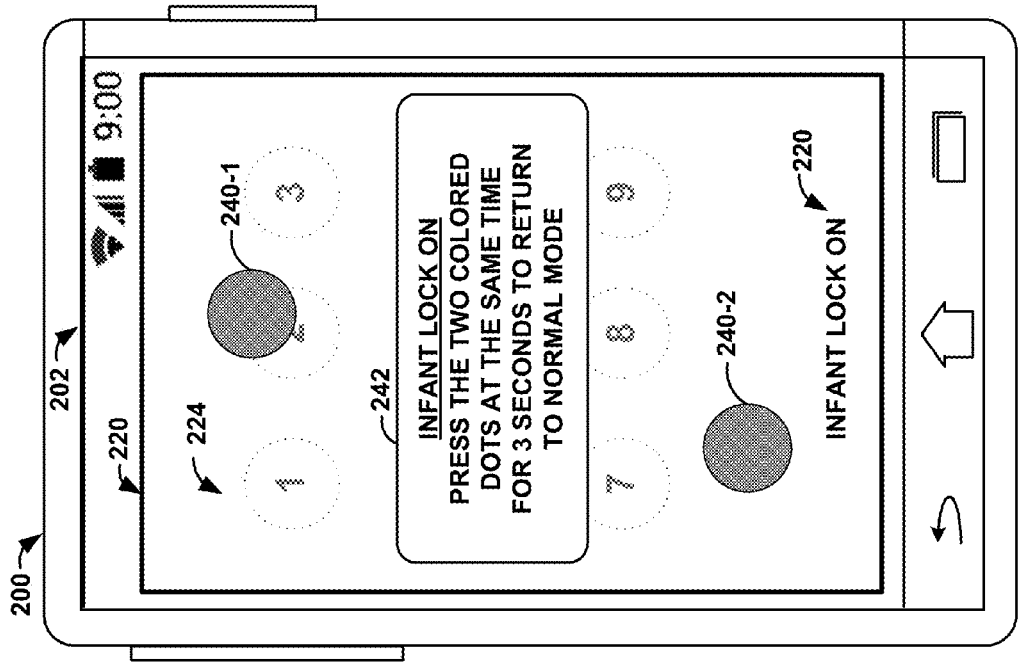
Figure 4D:
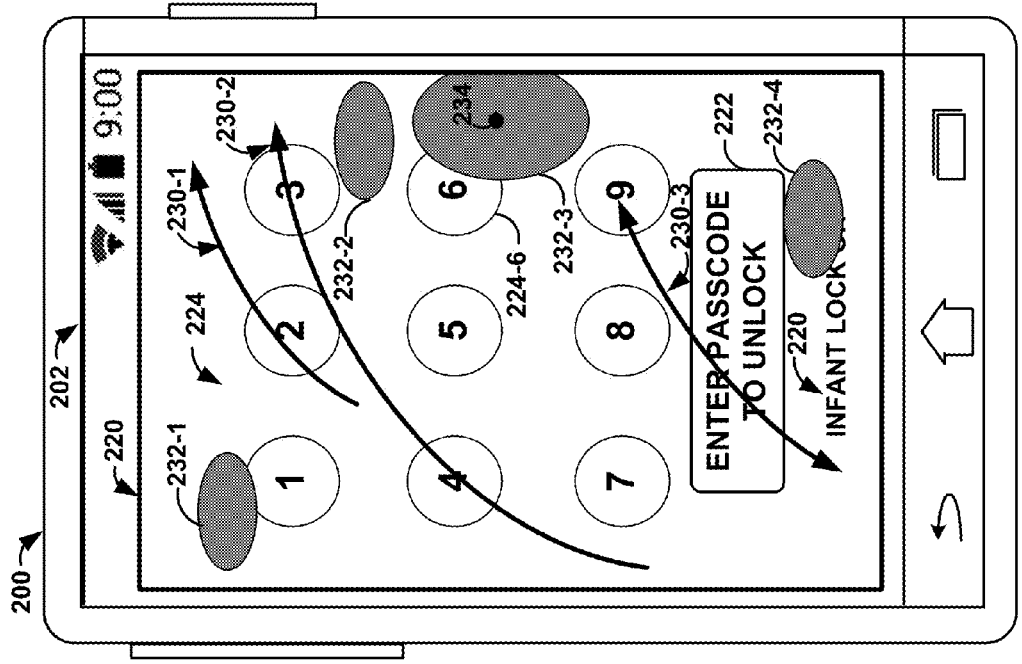

FIG. 4A-4D show an example operation of computing device 200 as computing device 200 is configured to be able to operate in a second limited-access state (FIG. 4A), to operating in a first limited-access state (FIG. 4B), to determining whether received user input has a value of a characteristic that exceeds a characteristic threshold while operating in the first limited-access state (FIG. 4C), to operating in a second limited-access state based on the determination (FIG. 4D). FIG. 4A-4D illustrate just one possible example of computing device 200 transitioning between access states, and many other examples are possible.

FIG. 4A illustrates computing device 200 including a presence-sensitive device 202 that outputs a graphical user interface (GUI) 204. In this example, computing device 200 is operating in an access state where one or more settings may be modified (for example, computing device 200 is operating in an unlocked access state). In the example of FIG. 4A, computing device 200 is currently accessing a settings feature, where changes may be made to settings or configuration of computing device 200. Presence-sensitive device 202 of computing device 200 outputs GUI 204 which includes one or more graphical elements. In this example, GUI 204 includes visual data related to settings of computing device 200.

GUI 204 includes a locking state graphical element 210. Locking state graphical element 210 is labeled "INFANT LOCK" and indicates that computing device 200 is configured to have an infant lock state available. The infant lock state may be the second limited-access state as described herein. GUI 204 also includes an activation graphical element 212 that indicates whether computing device 200 is configured to activate the infant lock feature. As illustrated in FIG. 4A, activation graphical element 212 includes the word "ON," thereby indicating that computing device 200 is configured to be able to operate in the second limited-access state.

Responsive to receiving user input at a location of the activation graphical element 212 at presence-sensitive device 202, computing device 200 may turn off the infant lock, thus preventing itself from being able to operate in the second limited-access state. Responsive to receiving such user input, computing device 200 may cause activation graphical element 212 to include the word "OFF" instead of "ON." Thus, computing device 200 includes a feature for the second limited-access state (i.e., infant lock) to be optional for a user. That is, a user will be able to opt-in to the feature of infant lock via settings on computing device 200.

The actual activation of the infant lock state will kick in when computing device 200 actually determines, based on algorithm or intelligence, that computing device 200 is likely being handled by an infant. If the user doesn't normally have pets or infants around, computing device 200 is not likely to operate in the second limited-access state very often. However, if the user takes computing device 200 to a location where infants or pets may access computing device 200, conditions for computing device 200 to operate in the second limited-access state may occur.

FIG. 4B illustrates computing device 200 operating in a first limited-access state. In this example, as described with respect to FIG. 4A, computing device 200 has been configured to be able to operate in a second limited-access state (e.g., infant lock is on). In this example, computing device 200 may have switched to operating in the first limited-access state because computing device 200 received an indication of user input corresponding to instructions to operate in the first limited-access state or may have entered the first limited-access state after a time period lapsed where computing device 200 did not receive any indication of user inputs. Computing device 200 requires receipt of an indication of user input that satisfies an unlocking condition of the first limited-access state before computing device 200 will operate in an open access state (such as in FIG. 4A).

Presence-sensitive device 202 of computing device 200 outputs a GUI 220. GUI 220 includes several graphical elements 222, 224, and 226. Instruction graphical element 222 includes an indication of instructions for how to unlock the first limited-access state. As shown herein, instruction graphical element 222 includes the words "ENTER PASSCODE TO UNLOCK," which inform a user of computing device 200 that computing device 200 is currently operating in the first limited-access state and also indicates how to unlock computing device 2 from operating in the first limited-access state. Thus, an unlocking condition for computing device 200 is the entering of the correct passcode.

GUI 220 also includes unlocking graphical elements 224, each of which correspond to a potential element of a passcode used to unlock computing device 2 from operating in the first limited-access state. As shown in FIG. 4B, unlocking graphical elements 224 include nine graphical elements, each corresponding to one of the digits 1-9. Computing device 200 is configured to unlock the first limited-access state and switched to operating in an open access state upon receiving an indication of one or more user inputs that satisfy an unlocking condition (e.g., the passcode). For example, the passcode for the first limited-access state of computing device 200 is "3948253." Responsive to presence-sensitive device 202 receiving indications of user interaction with the graphical elements corresponding to the passcode, 3948253, computing device 200 will transition to operating in an open access state.

GUI 220 further includes infant lock graphical element 226 which indicates that infant lock is on. That is, the presence of infant lock graphical element 226 in GUI 220, or that infant lock graphical element 226 includes the words "INFANT LOCK ON" indicates that computing device 200 is configured to be able to operate in the second limited-access state.

FIG. 4C illustrates an example where computing device 200 has received indication of user input at presence-sensitive device 202. In this example, computing device 200 is being held by an infant who cannot understand the graphical elements included in GUI 220. Computing device 200 is handled by the infant, who touches portions of presence-sensitive device 202. For example, presence-sensitive device 202 detects user input, including certain areas being pressed, as well as swipe motions across presence-sensitive device 202. The locations of presence-sensitive device 202 receiving indications of swipe gestures are indicated by swipe images 230-1 through 230-3 (collectively referred to herein as "swipe images 230"). The locations of presence-sensitive device 202 receiving indications of being pressed are indicated by area images 232-1 through 232-4 (collectively referred to herein as "area images 232").

In this example, swipe images 230 and area images 232 are illustrated as being overlaid on GUI 220. In this example, GUI 220 does not actually include graphical elements corresponding to swipe images 230 or area images 232, although in some examples, GUI 220 could include such graphical elements.

In this example, computing device 200 receives indications of user input corresponding to interactions with presence-sensitive device 202 represented by swipe images 230 and area images 232. An input module of computing device 200, for example, input module 10 of FIGS. 1 and 2, determines at least one value of a characteristic of the received user input. In this example, the characteristics of the user input may be location (e.g., where the user input is located with respect to presence-sensitive device 202), area (e.g., the size of the user input), proximity (e.g., a distance between the interaction and a passcode graphical element), a starting location, a stopping location, a length (e.g., the length of a swipe gesture), a speed (e.g., how quickly a swipe gesture was performed), or the like.

For example, say an infant is playing with computing device 200. Various inputs that may indicate an infant is handling computing device 200 instead of an adult may include that a touch is not well directed on the unlocking graphical elements 224, a touch is located between two or more unlocking graphical elements 224, presence-sensitive display 202 detects multiple touches at the same time, computing device 2 is handled very clumsily (i.e., not stably), a touch is beyond a region of the unlocking graphical elements 224, touches are too quickly done, or the like. The characteristic thresholds may reflect these qualities that indicate computing device 200 may be handled by an infant.

As shown in FIG. 4C, Computing device 200 receives an indication of user input represented with area images 232-3

(also referred to as "user input 232-3"). This user input may be, for example, where an infant touches computing device 200 with a palm. Input module 10 determines a value of a characteristic, for example, a distance from a center of a user input to an unlocking graphical element, of user input 232-3. As shown in FIG. 4C, user input 232-3 interacts with presence-sensitive device 202 near the unlocking graphical element 224 for the number "6", 224-6, and partially touches it. However, a center 234 of user input 232-2 is a distance from unlocking graphical element 224-6. Input module 10 may determine a value for the distance between center 234 and unlocking graphical element 224-6. Input module 10 may provide an indication of the distance to an access module of computing device 200, for example, access module 8 of FIGS. 1 and 2.

Access module 8 may compare the value of the characteristic (i.e., distance) to a threshold for that characteristic (i.e., distance threshold). In some examples, access module 8 may retrieve a value for the distance threshold from a database, such as characteristics database 62 of FIG. 2. Characteristics database 62 may include data related to characteristics of user input such as characteristic thresholds for possible characteristics of each user input type. For example, characteristics database 62 may include a characteristic threshold for a distance between a received user input and an interactive graphical element. In this example, characteristics database 62 may include a value for a threshold for the distance between a center of received user input and an unlocking graphical element.

Access module 8 compares the value of the distance to the distance threshold. If access module 8 determines that the value of the distance exceeds the distance threshold, access module 8 may cause computing device 200 to transition from the first limited-access state to a second limited-access state, different from the first limited-access state. In this example, access module 8 receives an indication from input module 10 that center 234 of user input 232-3 is approximately 1 cm from unlocking graphical element 224-6. Access module 8 retrieves the corresponding threshold from characteristics database 62, which indicates a distance threshold value of 0.3 cm. Access module 8 compares the value of the characteristic, 1 cm, to the characteristic threshold, 0.3 cm, and determines that characteristic of user input 232-3 exceeds the characteristic threshold.

Based on the comparison, access module 8 determines that user input 232-3 may be inadvertent. For example, an infant may be holding computing device 200 and haphazardly touching presence-sensitive device 202 in a way that is not likely to unlock computing device 200. This may be partially based on the idea that a user of computing device 200 who was attempting to unlock computing device 200 likely would not miss touching unlocking graphical element 224-6 by that wide of a margin (e.g., 6 cm). Therefore, the techniques described herein can be used to interpret user input and differentiate attempts at unlocking computing device 200 from other interactions with computing device 200.

If computing device 200 was not able to switch to operating in a second limited-access state, in response to receiving the above described user inputs, computing device 200 may delete data or implement features to prevent computing device 200 from being able to be unlocked. However, because computing device 200 is configured to enter the second limited-access mode, computing device 200 would not perform the protective features in response to receiving user input that has a value of a characteristic that exceeds a characteristic threshold.

In this example, access module 8 determines that the value of the distance exceeds the distance threshold and causes computing device 200 to transition from the first limited-access state to a second limited-access state. FIG. 4D illustrates an example GUI 240 while computing device 200 operating in the second limited-access state (e.g., "infant lock").

In FIG. 4D, computing device 200 has updated GUI 220 to indicate that computing device 200 is operating in the second limited-access state. GUI 220 includes an instruction graphical element 242 that describes how to satisfy an unlocking condition and unlock the infant lock state. Instruction graphical element 242 contains the words "INFANT LOCK ON" and "PRESS THE TWO COLORED DOTS AT THE SAME TIME FOR 3 SECONDS TO RETURN TO NORMAL MODE." As described herein, "normal mode" may correspond to the first limited-access state.

Graphical elements 240-1 and 240-2 correspond to the colored dots described in instruction graphical element 242. Unlocking graphical elements 224 have been faded, which may be in order to emphasize that computing device 200 is operating in the second limited-access state. When computing device 200 receives an indication of user input corresponding to graphical elements 240-1 and 240-2 being pressed at the same time for a duration of at least 3 second, computing device 200 transitions to operating in the first limited-access state.

While computing device 200 is operating in the second limited-access state, it ignores any received input that does not satisfy the unlocking condition. Thus, computing device 200 would not delete any data while in the second limited-access state. Also, computing device 200 would not prevent itself from being unlocked for a given time period after computing device 200 receives a number of user inputs that does not satisfy the unlocking condition. By outputting instructional graphical element 242, computing device 200 provides a user who can understand the instructions with information regarding the unlocking condition. Thus, users who cannot understand the unlocking condition, such as a pet or infant, may not know the unlocking condition. The unlocking condition may be such that inadvertent user input is unlikely to satisfy the unlocking condition.

Once computing device 200 receives an indication of user input that satisfies the unlocking condition of the second limited-access state, computing device 200 may return to operating in the first limited-access state, such as that shown in FIG. 4B.

Figure 5:
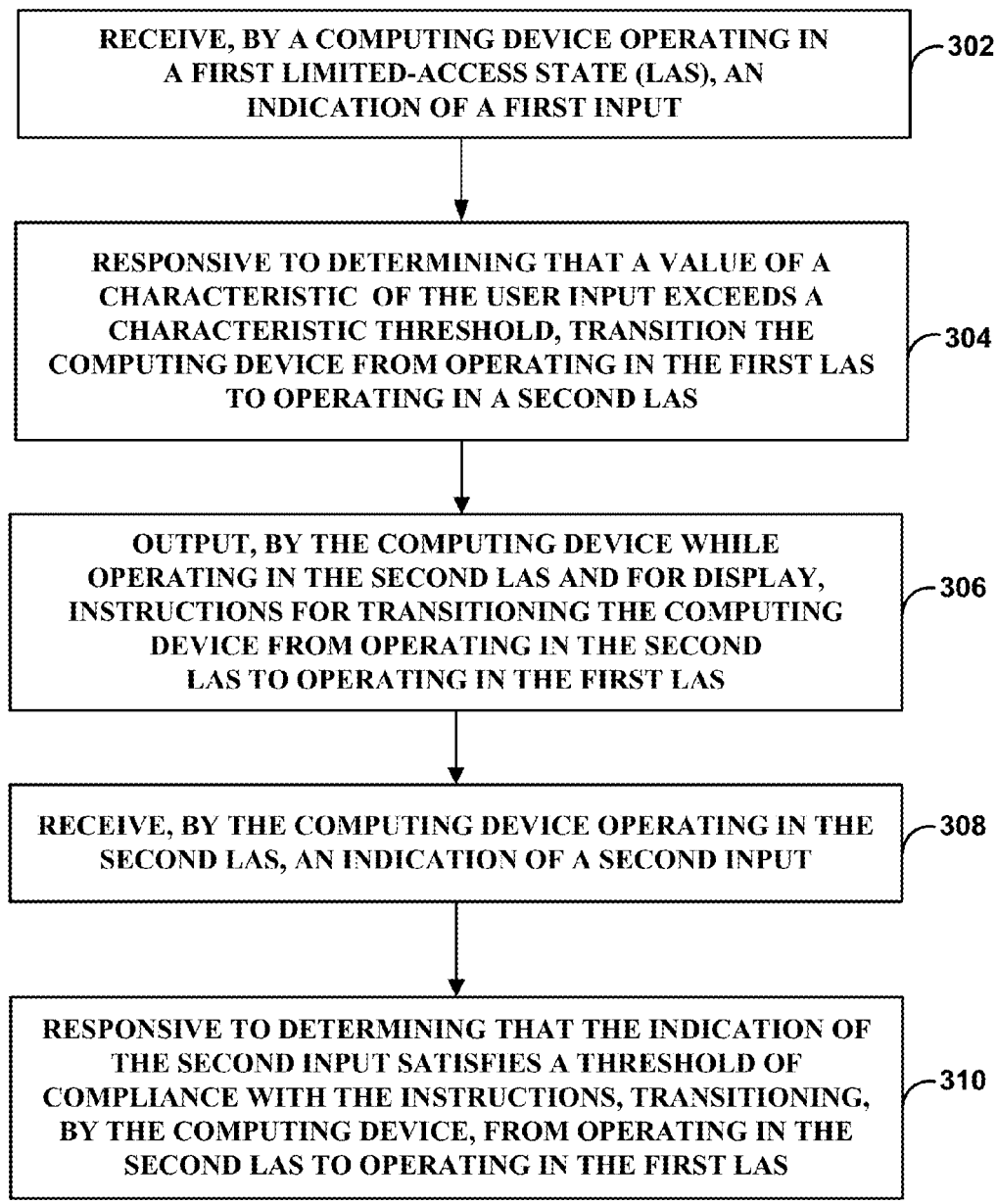
FIG. 5 is a flowchart illustrating an example operation of a computing device configured to operate in a second limited-access state responsive to a value of a characteristic of a user input exceeding a predetermined characteristic threshold, in accordance with one or more aspects of the present disclosure.

FIG. 5 is a flowchart illustrating an example operation of a computing device configured to operate in a second limited-access state responsive to a value of a characteristic of a user input exceeding a predetermined characteristic threshold, in accordance with one or more aspects of the present disclosure. The computing device may be computing device 2 of FIGS. 1 and 2, or computing devices 100 or 200 as described herein.

The example operations include receiving, by computing device 2 operating in a first limited-access state, an indication of a first input (302). The indication of the first input may be detected by a presence-sensitive device, such as presence-sensitive display 54 of FIG. 2. In other examples, the first input with is detected with a sensor device, such as one or more sensor devices 48. The indication of first input may be an indication of a first user input.

Responsive to determining that at least one value exceeds a predetermined characteristic threshold, the example operations further include transitioning the computing device from operating in the first limited-access state to operating in a second limited-access state, wherein the second limited-access state is different from the first limited-access state (304). For instance, access module 8 may cause computing device 2 to transition from the first limited-access state to the second limited-access state in response to determining that the at least one value of a characteristic of the user input exceeds the characteristic threshold. In some examples, the operations may include determining, by the computing device and based on the indication of the first input, whether at least one value of a characteristic of the first input exceeds a predetermined characteristic threshold. For example, an input module 10 of computing device 2 may determine at least one value of a characteristic of the first input. The characteristic of the user input may include tap frequency, area, location, distance between two points, starting point, ending point, length, velocity, acceleration of computing device 2, orientation of computing device 2, ambient light around computing device 2, a physical distance between an object and computing device 2, and a barometric pressure reading. In other examples, other characteristics may be determined. Computing device 2 may determine a value of the characteristic threshold from, for example, characteristics database 62. Input module 10 or access module 8 may compare at least one value of a characteristic of the user input to the characteristic threshold to determine if the value exceeds the threshold.

While operating in the second limited-access state, the method may further include outputting, by the computing device while operating in the second limited-access state and for display, instructions for transitioning the computing device from operating in the second limited-access state to operating in the first limited-access state (306). The instructions may be textual-based directions that describe how to unlock the second limited-access state, which may include, for example, a passcode to enter or how to interact with displayed graphical elements. Outputting instructions may further include outputting, by the computing device operating in the second limited-access state and for display, an interactive graphical element and an instruction graphical element, wherein the instruction graphical element provides text-based instructions that describe how to interact with the interactive graphical element to transition the computing device from operating in the second limited-access state to operating in the first limited-access state.

The method further includes receiving, by the computing device while operating in the second limited-access state, an indication of a second input (308). The second input may be a second user input. In some examples, computing device 2 may determine whether the second input satisfies an unlocking condition described in the instructions. For example, determining whether the second input satisfies an unlocking condition includes determining that the indication of the second input satisfies a threshold of compliance with the instructions for transitioning the computing device from operating in the second limited-access state to operating in the first limited-access state.

Responsive to determining that the indication of the second input satisfies a threshold of compliance with the instructions for transitioning the computing device from operating in the second limited-access state to operating in the first limited-access state, the method may further include transitioning, by the computing device, from operating in the second limited-access state to operating in the first limited-access state (310). For example, a user has understood the instructions outputted by computing device 2 while computing device 2 is operating in the second limited-access state. The user has followed the instructions for unlocking the second limited-access state and computing device 2 has now reverted back to operating in the first limited-access state.

In some examples, an unlocking condition for the first limited-access state is different from an unlocking condition for the second limited-access state. That is, the same input will not unlock both the first limited-access state and the second limited-access state. In another example, the first- and second-limited access states require different types of input in order to unlock the states. For example, the first limited-access state may require the entry of a passcode while the second limited-access state may require an indication of a graphical element dragged to another location on a presence-sensitive screen.

While computing device 2 is operating in the second limited-access state, the example operations may include refraining from taking an action to prevent computing device 2 from being unlockable based at least in part on the user input.

In some examples, the example operations include outputting, by the computing device while operating in the second limited-access state, at least two graphical elements for display at different locations of a display device. The example operations further include receiving, by the computing device, an indication of a second user input detected by a presence-sensitive input device, the second user input having a duration for which the presence-sensitive input device detected the second user input, wherein the second user input is detected by the presence-sensitive input device at locations corresponding to the different locations of the display device at which the at least two graphical elements are displayed. Responsive to determining that the duration of the second user input satisfies a time threshold, the example operations further include transitioning, by the computing device, the computing device from operating in the second limited-access state to operating in the first limited-access state.

In some examples, the user input is a touch-based user input, the characteristic of the user input comprises an area of the touch-based user input, predetermined characteristic threshold comprises an area threshold, determining at least one value of the characteristic comprises determining the at least one value corresponding to the area of the touch-based user input, and the area of the touch-based user input comprises an area of contact with a presence-sensitive input device. In such an example, the example operations further include determining that the at least one value of the area of the touch-based user input exceeds the area threshold.

In another example, the user input is a touch-based user input, the characteristic of the user input comprises a length of the touch-based user input, the predetermined characteristic threshold comprises an length threshold, determining at least one value of the characteristic comprises determining the at least one value corresponding to the length of the touch-based user input, and the length of the touch-based user input comprises a distance between an initial and final point of contact with a presence-sensitive input device. In such an example, the example operations further include determining that the at least one value of the length of the touch-based user input exceeds the length threshold.

In another example, the indication of user input is a first indication of user input, the characteristic is a first characteristic, the value is a first value, and the predetermined characteristic threshold is a first predetermined characteristic threshold. In such an example, the operations further include receiving, by the computing device operating in the first limited-access state, a second indication of user input. The operations may further include determining, by the computing device and based on the second indication of the user input, whether at least one second value of a second characteristic of the second user input exceeds a second predetermined characteristic threshold. Transitioning the computing device from operating in the first limited-access state to operating in a second limited-access state may be further responsive to determining the at least one second value exceeds the second predetermined characteristic threshold.

In some examples where the user input includes a sequence of motion events, the characteristic of the user input includes a tap frequency, the predetermined characteristic threshold includes a tap frequency threshold, and determining whether at least one value of the characteristic comprises determining the at least one value corresponding to the tap frequency, the example operations may further include determining, by the computing device and based at least in part on the sequence of motion events, a quantity of tap inputs received within an area of a presence-sensitive input device. The example operations may also include determining, by the computing device and based on a ratio between the quantity of tap inputs and a difference in time between a first time component of a first motion event of the sequence of motion events and a second time component of a last motion event of the sequence of motion events, the tap frequency of the user input. The example operations may further include determining, by the computing device, whether the tap frequency of the determined characteristic of the gesture input satisfies the tap frequency threshold.

The example operations may further include determining, by the computing device and based at least in part on a portion of the user input, a time-ordered sequence of motion events, each motion event in the time-ordered sequence of motion events including a respective location component. The example operations may also include determining, by the computing device and based at least in part on the respective location component of each of the motion events in the time-ordered sequence of motion events, a length of the user input. Each motion event in the time-ordered sequence of motion events may further include a respective time component. The example operation may further include determining, by the computing device, a velocity of the determined characteristic of the user input based on a ratio between the length of the user input and a difference of the respective time component of a first motion event of the time-ordered sequence of motion events and the respective time component of a last motion event of the time-ordered sequence of motion events.

Responsive to determining that greater than a threshold amount of time has elapse since the computing device last received an indication of any user input, the example operations may further include transitioning, by the computing device, from operating in the second limited-access state to operating in the first limited-access state.

Thus, computing device 2 may operate in a second limited-access state when it determines a received user input has a value that exceeds a threshold. Once operating in the second limited-access state, computing device 2 may remain unresponsive to most any input that does not satisfy the unlocking condition of the second limited-access state. Thus, the techniques of the disclosure may enable computing device 2 to transition from a first limited-access state to a second limited-access state wherein received user inputs are not processed as attempts to unlock the computing device from the first limited-access state. The techniques of the disclosure may prevent computing device 2 from taking actions based on inadvertent inputs by an otherwise authorized user. The techniques may further enable a user to activate the secondary limited-access state feature. Locking techniques may prevent computing device 2 from performing various actions in response to detecting accidental user input (e.g., when a user accidentally presses a button, shakes computing device 2, taps presence-sensitive display 54, or inadvertently activates presence-sensitive display 54 while computing device 2 is held by an infant or in a user's pocket). A computing device such as this may allow an authorized user of the computing device to relax in situations where the computing device receives inadvertent or haphazard user input while it is operating in a locked state.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described in this disclosure. These and other examples are within the scope of the following claims.

What is claimed is:

1. A method, comprising:
   while operating in a first limited-access state, receiving, by a computing device, an indication of a first input;
   responsive to determining that at least one value of a characteristic of the first input exceeds a predetermined characteristic threshold, transitioning, by the computing device, from operating in the first limited-access state to operating in a second limited-access state, wherein the second limited-access state is different from the first limited-access state;
   while operating in the second limited-access state:
      outputting, by the computing device, for display, a graphical user interface comprising instructions that specify user-provided input for transitioning the computing device from operating in the second limited-access state to operating in the first limited-access state; and
      receiving, by the computing device, an indication of a second input, the second input being a gesture input that is defined by one or more touch events; and
   responsive to determining, based at least in part on location information associated with the one or more touch events, that the indication of the second input satisfies a threshold of compliance with the instructions that specify user-provided input for transitioning the computing device from operating in the second limited-access state to operating in the first limited-access state, transitioning, by the computing device, from operating in the second limited-access state to operating in the first limited-access state.

2. The method of claim 1, wherein an unlocking condition for the first limited-access state is different from an unlocking condition for the second limited-access state.

3. The method of claim 1, wherein outputting, by the computing device and while operating in the second limited-access state and for display, the instructions further comprises:
   outputting, by the computing device, while operating in the second limited-access state and for display, an interactive graphical element and an instruction graphical element, wherein the instruction graphical element provides text-based instructions that describe how to interact with the interactive graphical element to transition the computing device from operating in the second limited-access state to operating in the first limited-access state.

4. The method of claim 1, wherein receiving, by the computing device while operating in the second limited-access state, an indication of a second input further comprises receiving, by the computing device, the indication of the second input detected by a presence-sensitive input device, the second input having a duration for which the presence-sensitive input device detected the second input, wherein the second input is detected by the presence-sensitive input device at locations corresponding to the different locations of the display device at which the at least two graphical elements are displayed, the method further comprising:
   outputting, by the computing device while operating in the second limited-access state, at least two graphical elements for display at different locations of a display device; and
   responsive to determining that a duration of the second input satisfies a time threshold, transitioning, by the computing device, the computing device from operating in the second limited-access state to operating in the first limited-access state.

5. The method of claim 1, wherein the at least one value of the characteristic of the first input comprises a value related to at least one of a shape, a length, an area, a velocity, a tap frequency, a change in orientation, and an acceleration.

6. The method of claim 1, wherein the first input is a touch-based input, wherein:
   the characteristic of the first input comprises an area of the touch-based input, the predetermined characteristic threshold comprises an area threshold,
   determining at least one value of the characteristic comprises determining the at least one value corresponding to the area of the touch-based input, and
   the area of the touch-based input comprises an area of contact with a presence-sensitive input device, the method further comprising:
   determining that the at least one value of the area of the touch-based input exceeds the area threshold.

7. The method of claim 1, wherein the first input is a touch-based input, wherein the characteristic of the first input comprises a length of the touch-based input, wherein the predetermined characteristic threshold comprises an length threshold, wherein determining at least one value of the characteristic comprises determining the at least one value corresponding to the length of the touch-based input, and wherein the length of the touch-based input comprises a distance between an initial and final point of contact with a presence-sensitive input device, the method further comprising:
   determining that the at least one value of the length of the touch-based input exceeds the length threshold.

8. The method of claim 1, further comprising:
   determining, by the computing device and based at least in part on a portion of the first input, a time-ordered sequence of motion events, each motion event in the time-ordered sequence of motion events including a respective location component; and
   determining, by the computing device and based at least in part on the respective location component of each of the motion events in the time-ordered sequence of motion events, a length of the first input,
   wherein each motion event in the time-ordered sequence of motion events further includes a respective time component, the method further comprising:
   determining, by the computing device, a velocity of the determined characteristic of the first input based on a ratio between the length of the first input and a difference of the respective time component of a first motion event of the time-ordered sequence of motion events and the respective time component of a last motion event of the time-ordered sequence of motion events.

9. The method of claim 1, wherein the characteristic is a first characteristic, wherein the value is a first value, wherein the predetermined characteristic threshold is a first predetermined characteristic threshold, the method further comprising:
   determining, by the computing device and based on the second input, whether at least one second value of a second characteristic of the second input exceeds a second predetermined characteristic threshold; and wherein transitioning the computing device from operating in the first limited-access state to operating in a second limited-access state is further responsive to determining the at least one second value exceeds the second predetermined characteristic threshold.

10. The method of claim 1, wherein the first input includes a sequence of motion events, wherein the characteristic of the first input includes a tap frequency, wherein the predetermined characteristic threshold includes a tap frequency threshold, wherein determining whether at least one value of the characteristic comprises determining the at least one value corresponding to the tap frequency, the method further comprising:
   determining, by the computing device and based at least in part on the sequence of motion events, a quantity of tap inputs received within an area of a presence-sensitive input device;
   determining, by the computing device and based on a ratio between the quantity of tap inputs and a difference in time between a first time component of a first motion event of the sequence of motion events and a second time component of a last motion event of the sequence of motion events, the tap frequency of the first input; and
   determining, by the computing device, whether the tap frequency of the determined characteristic of the first input satisfies the tap frequency threshold.

11. The method of claim 1, further comprising detecting the first input with a sensor device, wherein the determined characteristic of the first input detected with the sensor device includes at least one of an acceleration of the computing device, an orientation of the computing device, an ambient light measurement within a predefined distance from the computing device, a physical distance between an object and the computing device, and a barometric pressure reading.

12. The method of claim 1, while the computing device is operating in the second limited-access state, refraining from taking an action to prevent the computing device from being unlockable based at least in part on the first input.

13. The method of claim 1, further comprising responsive to determining that greater than a threshold amount of time has elapse since the computing device last received an indication of any user input transitioning, by the computing device, the computing device from operating in the second limited-access state to operating in the first limited-access state.

14. A computing device comprising:
   a presence-sensitive input device; and
   one or more processors operable to:
      while the computing device is operating in a first limited-access state, receive an indication of a first input detected by the presence-sensitive input device;
      responsive to determining that at least one value of a characteristic of the first input exceeds a predetermined characteristic threshold, transition the computing device from operating in the first limited-access state to operating in a second limited-access state, wherein the second limited-access state is different from the first limited-access state;
      while operating in the second limited-access state:
         output, for display, a graphical user interface comprising instructions that specify user-provided input for transitioning the computing device from operating in the second limited-access state to operating in the first limited-access state; and
         receive an indication of a second input, the second input being a gesture input that is defined by one or more touch events; and
      responsive to determining, based at least in part on location information associated with the one or more touch events, that the indication of the second input satisfies a threshold of compliance with the instructions that specify user-provided input for transitioning the computing device from operating in the second limited-access state to operating in the first limited-access state, transition the computing device from operating in the second limited-access state to operating in the first limited-access state.

15. The computing device of claim 14, wherein the one or more processors are further operable to output, the instructions for display by at least outputting, for display, an interactive graphical element and an instruction graphical element, wherein the instruction graphical element comprises text-based instructions that describe how to interact with the interactive graphical element to transition the computing device from operating in the second limited-access state to operating in the first limited-access state.

16. The computing device of claim 15, wherein the one or more processors are further operable to, while the computing device is operating in the second limited-access state, refrain from taking an action to prevent the computing device from being unlockable based at least in part on the first input.

17. The computing device of claim 14, further comprising:
   at least one sensor device, wherein the at least one sensor device comprises at least one of an accelerometer, a gyro, an ambient light sensor, a proximity sensor, and a barometer, wherein the one or more processors is further operable to receive the indication of the first input detected by the at least one sensor device.

18. A non-transitory computer-readable storage medium encoded with instructions that, when executed by one or more processors of a computing device, cause the one or more processors to:
   while operating in a first limited-access state, receive, while the computing device is operating in a first limited-access state, an indication of a first input;
   responsive to determining that at least one value of a characteristic of the first input exceeds a predetermined characteristic threshold, transition the computing device from operating in the first limited-access state to operating in a second limited-access state, wherein the second limited-access state is different from the first limited-access state;
   while operating in the second limited-access state:
      output, for display, a graphical user interface comprising instructions that specify user-provided input for transitioning the computing device from operating in the second limited-access state; and
      receive an indication of a second input, the second input being a gesture input that is defined by one or more touch events; and
   responsive to determining, based at least in part on location information associated with the one or more touch events, that the indication of the second input satisfies a threshold of compliance with the instructions that specify user-provided input for transitioning the computing device from operating in the second limited-access state to operating in the first limited-access state, transition the computing device from operating in the second limited-access state to operating in the first limited-access state.

19. The non-transitory computer-readable storage medium of claim 18, the non-transitory computer-readable storage medium comprising additional instructions that when executed by the one or more processors of the computing device, cause the one or more processors to output the instructions for display by at least outputting, for display, while the computing device is operating in the second limited-access state, an interactive graphical element and an instruction graphical element, wherein the instruction graphical element comprises text-based instructions that describe how to interact with the interactive graphical element to transition the computing device from operating in the second limited-access state to operating in the first limited-access state.

20. The non-transitory computer-readable storage medium of claim 18, the non-transitory computer-readable storage medium comprising additional instructions that when executed by the one or more processors of the computing device, cause the one or more processors to refrain from taking an action to prevent the computing device from being unlockable based at least in part on the first input while the computing device is operating in the second limited-access state.

\* \* \* \* \*

UNITED STATES PATENT AND TRADEMARK OFFICE
CERTIFICATE OF CORRECTION

| | | |
|---|---|---|
| PATENT NO. | : 8,938,612 B1 | Page 1 of 1 |
| APPLICATION NO. | : 14/065116 | |
| DATED | : January 20, 2015 | |
| INVENTOR(S) | : Sanjeev Kumar Mittal | |

It is certified that error appears in the above-identified patent and that said Letters Patent is hereby corrected as shown below:

Title Page, item 72: "Sanjev Kumar Mittal" should be changed to -- Sanjeev Kumar Mittal --

Signed and Sealed this
Fifth Day of May, 2015

Michelle K. Lee
*Director of the United States Patent and Trademark Office*